United States Patent
Ramesh et al.

(10) Patent No.: US 11,941,371 B2
(45) Date of Patent: *Mar. 26, 2024

(54) BIT STRING ACCUMULATION

(71) Applicant: Micron Technology, Inc., Boise, ID (US)

(72) Inventors: Vijay S. Ramesh, Boise, ID (US); Katie Blomster Park, Liberty Lake, WA (US)

(73) Assignee: Micron Technology, Inc., Boise, ID (US)

( * ) Notice: Subject to any disclaimer, the term of this patent is extended or adjusted under 35 U.S.C. 154(b) by 108 days.

This patent is subject to a terminal disclaimer.

(21) Appl. No.: 17/589,345

(22) Filed: Jan. 31, 2022

(65) Prior Publication Data
US 2022/0156046 A1 May 19, 2022

Related U.S. Application Data

(63) Continuation of application No. 16/794,550, filed on Feb. 19, 2020, now Pat. No. 11,275,562.

(51) Int. Cl.
*G06F 7/575* (2006.01)
*G06F 5/01* (2006.01)

(52) U.S. Cl.
CPC .............. *G06F 7/575* (2013.01); *G06F 5/01* (2013.01)

(58) Field of Classification Search
CPC .......... G06F 7/57; G06F 7/575; G06F 7/5443; G06F 7/499–49984; G06F 5/01; G06F 9/30098–30141
See application file for complete search history.

(56) References Cited

U.S. PATENT DOCUMENTS

| 4,282,581 A | 8/1981 | Bondurant et al. |
| 4,758,972 A | 7/1988 | Frazier |
| 6,687,724 B1 | 2/2004 | Mogi et al. |

(Continued)

FOREIGN PATENT DOCUMENTS

| EP | 1320800 B1 | 5/2004 |
| KR | 1020160130324 A | 11/2016 |

OTHER PUBLICATIONS

International Search Report and Written Opinion from related PCT Application No. PCT/US2021/016504, dated Apr. 27, 2021, 10 pages.

Gustafson, et al. "Beating Floating Point at its Own Game: Posit Arithmetic", Jan. 2017, retrieved from <http://www.johngustafson.net/pdfs/BeatingFloatingPoint.pdf>, 16 pages.

(Continued)

*Primary Examiner* — Emily E Larocque
*Assistant Examiner* — Carlo Waje
(74) *Attorney, Agent, or Firm* — Brooks, Cameron & Huebsch, PLLC

(57) ABSTRACT

Systems, apparatuses, and methods related to bit string accumulation are described. A method for bit string accumulation can include performing an iteration of a recursive operation using a first bit string and a second bit string and modifying a quantity of bits of a result of the iteration of the recursive operation, wherein the modified quantity of bits is less than a threshold quantity of bits. The method can further include writing a first value comprising the modified bits indicative of the result of the iteration of the recursive operation to a first register and writing a second value indicative of the factor corresponding to the result of the iteration of the recursive operation to a second register.

20 Claims, 6 Drawing Sheets

(56) References Cited

U.S. PATENT DOCUMENTS

| | | | |
|---|---|---|---|
| 7,761,495 B2* | 7/2010 | Jaber | G06F 17/142 |
| | | | 708/403 |
| 7,865,541 B1 | 1/2011 | Langhammer | |
| 8,214,417 B2 | 7/2012 | Ahmed | |
| 10,678,509 B1 | 6/2020 | Settle et al. | |
| 10,833,700 B2 | 11/2020 | Ramesh | |
| 10,943,039 B1 | 3/2021 | Sirasao et al. | |
| 2011/0153995 A1 | 6/2011 | Byun et al. | |
| 2014/0095850 A1 | 4/2014 | Plotnikov et al. | |
| 2016/0246811 A1 | 8/2016 | Ackerman et al. | |
| 2018/0232621 A1 | 8/2018 | Du et al. | |
| 2018/0322607 A1 | 11/2018 | Mellempudi et al. | |
| 2019/0095175 A1 | 3/2019 | Yamanaka et al. | |
| 2019/0227799 A1 | 7/2019 | Chen et al. | |
| 2019/0265949 A1 | 8/2019 | Ito et al. | |
| 2019/0294413 A1 | 9/2019 | Vantrease et al. | |
| 2020/0089472 A1 | 3/2020 | Pareek et al. | |
| 2020/0371746 A1 | 11/2020 | Notsu et al. | |
| 2020/0387474 A1 | 12/2020 | Ramesh | |

OTHER PUBLICATIONS

Z. Carmichael, H. F. Langroudi, C. Khazanov, J. Lillie, J. L. Gustafson and D. Kudithipudi, "Deep Positron: A Deep Neural Network Using the Posit Number System," 2019 Design, Automation & Test in Europe Conference & Exhibition (DATE), 2019, pp. 1421-1426, doi: 10.23919/DATE.2019.8715262. (Year: 2019).

N. Neves, P. Tomas and N. Roma, "Dynamic Fused Multiply-Accumulate Posit Unit with Variable Exponent Size for Low-Precision DSP Applications," 2020 IEEE Workshop on Signal Processing Systems (Si PS), 2020, pp. 1-6, doi: 10.1109/SiPS50750.2020.9195256. (Year: 2020).

Jain et al. "CLARINET: A RISC-V Based Framework for Posit Arithmetic Empiricism". Retrieved on [Jun. 10, 2021]. Retrieved from the Internet <https://arxiv.org/abs/2006.00364> (Year: 2020).

Patterson et al., "Computer Organization and Design: The Hardware/Software Interface", Fifth Edition, 2014. Retrieved from <https://ict.iitk.ac.in/wp-content/uploads/CS422-Computer-Architecture-ComputerOrganizationAnd Design 5th Edition2014.pdf> (Year: 2014).

* cited by examiner

BIT STRING ACCUMULATION

PRIORITY INFORMATION

This application is a Continuation of U.S. application Ser. No. 16/794,550, filed Feb. 19, 2020, the contents of which are included herein by reference.

TECHNICAL FIELD

The present disclosure relates generally to semiconductor memory and methods, and more particularly, to apparatuses, systems, and methods for bit string accumulation.

BACKGROUND

Memory devices are typically provided as internal, semiconductor, integrated circuits in computers or other electronic systems. There are many different types of memory including volatile and non-volatile memory. Volatile memory can require power to maintain its data (e.g., host data, error data, etc.) and includes random access memory (RAM), dynamic random access memory (DRAM), static random access memory (SRAM), synchronous dynamic random access memory (SDRAM), and thyristor random access memory (TRAM), among others. Non-volatile memory can provide persistent data by retaining stored data when not powered and can include NAND flash memory, NOR flash memory, and resistance variable memory such as phase change random access memory (PCRAM), resistive random access memory (RRAM), and magnetoresistive random access memory (MRAM), such as spin torque transfer random access memory (STT RAM), among others.

Memory devices may be coupled to a host (e.g., a host computing device) to store data, commands, and/or instructions for use by the host while the computer or electronic system is operating. For example, data, commands, and/or instructions can be transferred between the host and the memory device(s) during operation of a computing or other electronic system.

DETAILED DESCRIPTION

Figure 1:
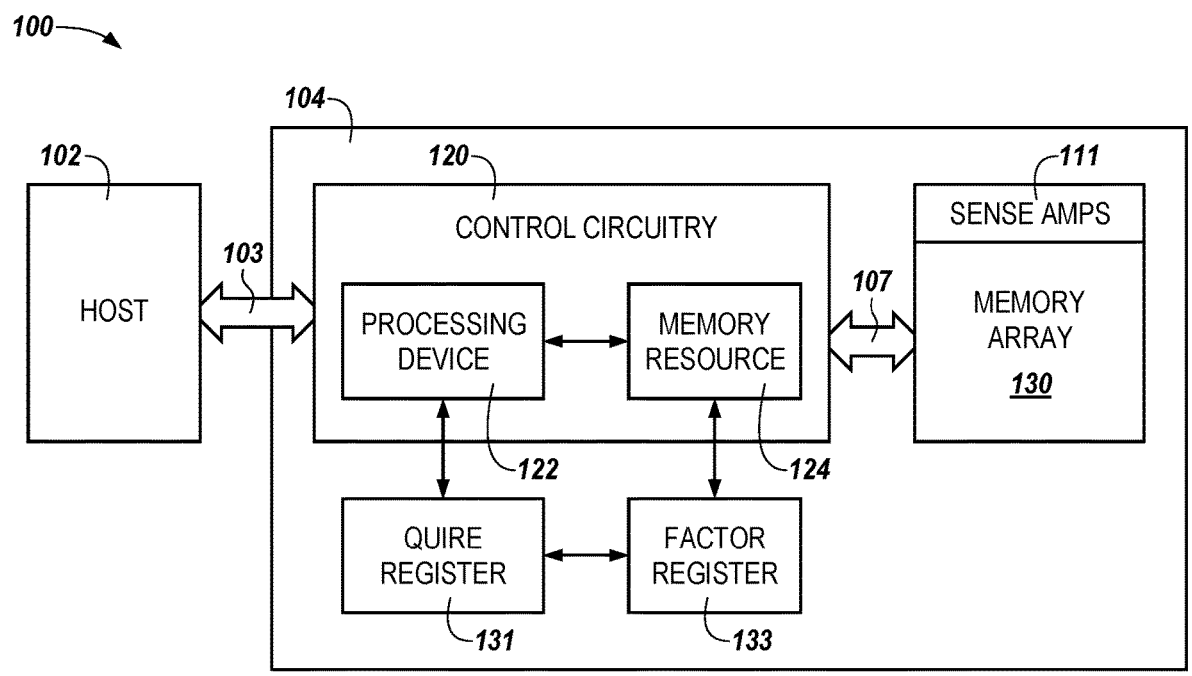
FIG. 1 is a functional block diagram in the form of an apparatus including a host and a memory device in accordance with a number of embodiments of the present disclosure.

Systems, apparatuses, and methods related to bit string accumulation are described. A method for bit string accumulation can include performing an iteration of a recursive operation using a first bit string and a second bit string and modifying a quantity of bits of a result of the iteration of the recursive operation, wherein the modified quantity of bits is less than a threshold quantity of bits. The method can further include writing a first value comprising the modified bits indicative of the result of the iteration of the recursive operation to a first register and writing a second value indicative of the factor corresponding to the result of the iteration of the recursive operation to a second register.

Computing systems can be used to perform a wide of range of operations using data such as bit strings, which can be processed by the computing system to facilitate operation of the computing system, as well as to perform computations using the data. Such operations can involve large sets of data and/or large bit strings and can therefore require vast computing resources (e.g., processing and/or memory resources) in their performance. Some examples of operations that can be performed using a computing system can include arithmetic operations, logical operations, bit-wise operations, vector operations, and/or dot product operations, as well as recursive operations, such as accumulate operations, multiply-accumulate (MAC) operations, fused-multiply add (FMA) operations, and/or fused multiply-accumulate (FMAC) operations, among others.

As used herein, a "recursive operation" generally refers to an operation that is performed a specified quantity of times where a result of a previous iteration of the recursive operation is used an operand for a subsequent iteration of the operation. For example, a recursive multiplication operation can be an operation in which two bit string operands, $\beta$ and $\varphi$ are multiplied together and the result of each iteration of the recursive operation is used as a bit string operand for a subsequent iteration. Stated alternatively, a recursive operation can refer to an operation in which a first iteration of the recursive operation includes multiplying $\beta$ and $\varphi$ together to arrive at a result $\lambda$ (e.g., $\beta \times \varphi = \lambda$). The next iteration of this example recursive operation can include multiplying the result $\lambda$ by $\varphi$ to arrive at another result $\omega$ (e.g., $\lambda \times \varphi = \omega$).

Another illustrative example of a recursive operation can be explained in terms of calculating the factorial of a natural number. This example, which is given by Equation 1 can include performing recursive operations when the factorial of a given number, n, is greater than zero and returning unity if the number n is equal to zero:

$$\text{fact}(n) = \begin{cases} 1 & \text{if } n = 0 \\ n \times \text{fact}(n-1) & \text{if } n > 0 \end{cases} \quad \text{Equation 1}$$

As shown in Equation 1, a recursive operation to determine the factorial of the number n can be carried out until n is equal to zero, at which point the solution is reached and the recursive operation is terminated. For example, using Equation 1, the factorial of the number n can be calculated recursively by performing the following operations: n×(n−1)×(n−2)× . . . ×1.

Yet another example of a recursive operation is a multiply-accumulate operation in which an accumulator, a is modified at iteration according to the equation a←a+(b×c). In a multiply-accumulate operation, each previous iteration of the accumulator a is summed with the multiplicative product of two operands b and c.

Due to their nature, the size of a result of each iteration of a recursive operation can be larger than the result of a previous iteration. As a result, in some approaches, performance of recursive operations, especially those that are performed for a large number of iterations (e.g., millions or billions of iterations) can require a large amount of memory resources to store accurate results of the operation. In order to reduce the amount of memory resources, computation time, processing resources, and/or processing time that can be required to store accurate results of a recursive operation, some approaches allow for recursive operations to be performed with one or more roundings (e.g., a may be truncated at one or more iterations of the operation). Although such approaches can reduce the amount of memory resources that may be demanded for such operations, by rounding results of iterations of the recursive operation, the inaccuracies introduced by such roundings can be propagated through the operation thereby creating a more pronounced effect in the accuracy of a final result of the recursive operation.

Further, in some approaches in which the results of iterations are rounded during performance of a recursive operation, the amount by which the results of the iterations are rounded may not be taken into account. For example, in some approaches, the portion of the result of the iterations (or final result) of the recursive operation that are removed during the rounding can be discarded, thereby making it impossible to recover accuracy and/or precision of the recursive operation that is lost during rounding.

Some approaches provide a small cache or set of registers (e.g., a hidden scratch area) for temporary calculations, such as intermediate results of recursive operations. However, in such approaches, these registers or cache(s) may not be large enough to support storage of exact results of intermediate recursive large bit string operations (e.g., operations using 32-bit or 64-bit bit string operands) without incurring rounding errors due to the size constraints of the registers or cache(s). Even when using smaller vectors for recursive operations (e.g., 8-bit or 16-bit bit string operands), the registers or cache(s) may become overrun depending on the number of iterations used in the recursive operation.

In some approaches, the small cache or set of registers (e.g., the hidden scratch area) can be "hidden" (e.g., not accessible by a user). In contrast, in some embodiments, access to the peripheral circuitry of the memory device (e.g., the special purpose registers described herein) can be provided to a user of the computing system in which the memory device is operating. For example, a user may be provided with the ability to control access to the peripheral circuitry, which can allow for greater control of operations that take advantage of the peripheral circuitry, such as recursive operations. This can allow for greater control of what types of operations are allowed to utilize the peripheral circuitry, can allow for greater control over when recursive operations are terminated, and/or greater control over when a resultant bit string stored in the peripheral circuitry is truncated.

In addition, embodiments herein can allow for a recursive operation to be performed while maintaining a high level of accuracy in the intermediate iterations of the operation. For example, by modifying a quantity of bits associated with iterations of the recursive operation by scaling the intermediate results by a factor and storing the intermediate result having the reduced quantity of bits and the factor, the accuracy of results of the operation can be recovered by reapplying the factor to the final result of the operation. In some embodiments, a result of an iteration can be scaled (e.g., divided, multiplied, etc.) by a factor of two (e.g., by $2^X$). The scaled result of the iteration can be stored and the factor of two (e.g., the factor X when the result is modified by $2^X$) can be stored. Once the operation is complete, the final result can be multiplied by the stored factor to recover the result of the operation. In some embodiments, the modified result of the iteration of the recursive operation can be stored in a first special purpose register (e.g., a "quire register") and the factor can be stored in a second special purpose register (e.g., a "factor register").

Embodiments herein are directed to hardware circuitry (e.g., control circuitry) configured to perform various operations on bit strings to improve the overall functioning of a computing device. For example, embodiments herein are directed to hardware circuitry that is configured to perform operations (e.g., recursive operations) using bit strings, modify results of iterations of the operations, and/or cause results of the operations and a factor by which the results were modified to be accumulated (e.g., stored) in peripheral circuitry of a memory device, such as periphery sense amplifiers, extended row address components, registers (e.g., the quire register and/or the factor register), etc.

As used herein, "periphery sense amplifiers" can include sense amplifiers configured to latch a data value that are located in a periphery (e.g., exterior to) a memory device while "extended row address components" can include multiple latches and/or flip-flops that are located in the periphery of a memory device. As used herein, "registers" can include special purpose storage locations that can store data for use by a computing system. Registers can be relatively small (e.g., on the order of tens to hundreds of bits) that can be used to store bit sequences or other bit strings. As described in more detail, herein, a first register can be allocated to store a modified result of an iteration or final result of a recursive operation (e.g., as a "quire register") and a second register (e.g., a "factor register") can be allocated to store a factor corresponding to an order of magnitude by which a result of an operation is increased or decreased can be provided within a computing system to facilitate embodiments of the present disclosure. In some embodiments, a third register can be allocated to store one or more bits corresponding to a sign of the modified result of the iteration or final result of the recursive operation, as described in connection with FIG. 3B, herein.

By utilizing peripheral circuitry of a memory device and/or the special purpose registers described herein to store modified results of iterations of recursive operations, as well as the factor by which the result of the iteration was modified, the accuracy of a result of the recursive operation can be improved in comparison to approaches that do not utilize peripheral circuitry of a memory device and/or the special purpose registers described herein in such a manner.

In order to minimize the size of the special purpose registers described herein, while maintaining high accuracy of results of operations, embodiments of the present disclosure can utilize a first special purpose register that is configurable in size to store results of operations that have had a bit width associated therewith modified by a factor (e.g., an order of magnitude) and a second special purpose register that is used to store the factor by which the results of the operation have been modified. In some embodiments, the first special purpose register can be configured to store ten (10) to fourteen (14) bits while the second special purpose register can be configured to store less than ten (10) bits. As described in more detail, herein, embodiments are not so limited, however, and in some embodiments, the special purpose registers can be deployed within peripheral circuitry (e.g., sense amplifiers located in a periphery of a memory array), an application-specific integrated circuit, a field-programmable gate array, or other special purpose circuitry capable of storing bit strings or other data.

Storing modified results of iterations of a recursive operation (e.g., storing a result of the operation that has been modified by the factor and storing the factor) in the special purpose registers, as described herein, can facilitate improved performance of the computing system by allowing for improved precision and/or accuracy in performed arithmetic and/or logical operations in applications where precision and/or accuracy are desirable while minimizing a footprint used by the additional special purpose registers. For example, in some embodiments, storing modified results of iterations of recursive operations as well as a factor by which the result of the operation was modified can allow for computations to be carried out with a high degree of accuracy (e.g., 99.99% accuracy) within a minimal amount of physical space, thereby limiting manufacturing costs associated with the inclusion of additional circuitry exhibited by some approaches. It will be appreciated that the accuracy (and therefore how "high" the degree of accuracy is) can be relative to a highest magnitude data value included in a recursive operation. Further, by utilizing small special purpose registers to store results of iterations of recursive operations, power consumption may be reduced in comparison to approaches in which larger registers are employed because fewer bits may be stored in the small special purpose registers described herein.

In some embodiments, the peripheral circuitry and/or the special purpose registers described herein can be variable in size (e.g., can be scalable). For example, embodiments of the present disclosure can allow for a quantity of bits allocated within peripheral circuitry and/or the register(s) to be dynamically modified based on characteristics of the bit strings and/or the results of iterations of recursive operations that will be stored by the peripheral circuitry and/or the registers. For example, the quantity of bits allocated within the peripheral circuitry and/or the registers can be set on an ad hoc basis based on the length of bit strings used in the performance of a recursive operation, based on the number of iterations associated with performance of the recursive operation, or on other characteristics of the bit strings and/or results of operations performed using the bit strings.

In some embodiments, results of iterations of multiple recursive operations that are performed in parallel can be stored in multiple registers and/or in partitions within the peripheral circuitry. For example, in some embodiments, a first portion of the registers or peripheral circuitry can be allocated to store modified results of iterations of a particular recursive operation and the factor by which the result of the iteration of the particular recursive operation was modified while a second portion of the registers or peripheral circuitry can be allocated to store modified results of iterations of a different recursive operation and the factor by which the result of the iteration of the different recursive operation was modified. In this manner, multiple recursive operations may be performed in parallel while taking advantage of the disclosed novel aspects of the disclosure.

In the following detailed description of the present disclosure, reference is made to the accompanying drawings that form a part hereof, and in which is shown by way of illustration how one or more embodiments of the disclosure may be practiced. These embodiments are described in sufficient detail to enable those of ordinary skill in the art to practice the embodiments of this disclosure, and it is to be understood that other embodiments may be utilized and that process, electrical, and structural changes may be made without departing from the scope of the present disclosure.

As used herein, designators such as "N" and "M," etc., particularly with respect to reference numerals in the drawings, indicate that a number of the particular feature so designated can be included. It is also to be understood that the terminology used herein is for the purpose of describing particular embodiments only, and is not intended to be limiting. As used herein, the singular forms "a," "an," and "the" can include both singular and plural referents, unless the context clearly dictates otherwise. In addition, "a number of," "at least one," and "one or more" (e.g., a number of memory banks) can refer to one or more memory banks, whereas a "plurality of" is intended to refer to more than one of such things.

Furthermore, the words "can" and "may" are used throughout this application in a permissive sense (i.e., having the potential to, being able to), not in a mandatory sense (i.e., must). The term "include," and derivations thereof, means "including, but not limited to." The terms "coupled" and "coupling" mean to be directly or indirectly connected physically or for access to and movement (transmission) of commands and/or data, as appropriate to the context. The terms "bit strings," "data," and "data values" are used interchangeably herein and can have the same meaning, as appropriate to the context. In addition, the terms "set of bits," "bit sub-set," and "portion" (in the context of a portion of bits of a bit string) are used interchangeably herein and can have the same meaning, as appropriate to the context.

The figures herein follow a numbering convention in which the first digit or digits correspond to the figure number and the remaining digits identify an element or component in the figure. Similar elements or components between different figures may be identified by the use of similar digits. For example, 120 may reference element "20" in FIG. 1, and a similar element may be referenced as 220 in FIG. 2. A group or plurality of similar elements or components may generally be referred to herein with a single element number. For example, a plurality of reference elements 433-1, 433-2, . . . , 433-N may be referred to generally as 433. As will be appreciated, elements shown in the various embodiments herein can be added, exchanged, and/or eliminated so as to provide a number of additional embodiments of the present disclosure. In addition, the proportion and/or the relative scale of the elements provided in the figures are intended to illustrate certain embodiments of the present disclosure and should not be taken in a limiting sense.

FIG. 1 is a functional block diagram in the form of a computing system 100 including an apparatus including a host 102 and a memory device 104 in accordance with a number of embodiments of the present disclosure. As used herein, an "apparatus" can refer to, but is not limited to, any of a variety of structures or combinations of structures, such as a circuit or circuitry, a die or dice, a module or modules, a device or devices, or a system or systems, for example. The memory device 104 can include a one or more memory modules (e.g., single in-line memory modules, dual in-line memory modules, etc.). The memory device 104 can include volatile memory and/or non-volatile memory. In a number of embodiments, memory device 104 can include a multi-chip device. A multi-chip device can include a number of different memory types and/or memory modules. For example, a memory system can include non-volatile or volatile memory on any type of a module.

As shown in FIG. 1, the apparatus 100 can include control circuitry 120, which can include a processing device 122 and a memory resource 124, a memory array 130, and sense amplifiers 111 (e.g., the SENSE AMPS 111). In addition, the memory device 104 can include a first special purpose register (e.g., the quire register 131) and a second special purpose register (e.g., the factor register 133), which can be communicatively coupled to the control circuitry 120. Each of the components (e.g., the host 102, the control circuitry 120, the processing device 122, the memory resource 124, the quire register 142, the factor register 133, and/or the memory array 130) can be separately referred to herein as an "apparatus."

The memory device 104 can provide main memory for the computing system 100 or could be used as additional memory or storage throughout the computing system 100. The memory device 104 can include one or more memory arrays 130 (e.g., arrays of memory cells), which can include volatile and/or non-volatile memory cells. The memory array 130 can be a flash array with a NAND architecture, for example. Embodiments are not limited to a particular type of memory device. For instance, the memory device 104 can include RAM, ROM, DRAM, SDRAM, PCRAM, RRAM, and flash memory, among others.

In embodiments in which the memory device 104 includes non-volatile memory, the memory device 104 can include flash memory devices such as NAND or NOR flash memory devices. Embodiments are not so limited, however, and the memory device 104 can include other non-volatile memory devices such as non-volatile random-access memory devices (e.g., NVRAM, ReRAM, FeRAM, MRAM, PCM), "emerging" memory devices such as variable resistance (e.g., 3-D Crosspoint (3D XP) memory devices), memory devices that include an array of self-selecting memory (SSM) cells, etc., or combinations thereof. Variable resistance memory devices can perform bit storage based on a change of bulk resistance, in conjunction with a stackable cross-gridded data access array. Additionally, in contrast to many flash-based memories, variable resistance non-volatile memory can perform a write in-place operation, where a non-volatile memory cell can be programmed without the non-volatile memory cell being previously erased. In contrast to flash-based memories and variable resistance memories, self-selecting memory cells can include memory cells that have a single chalcogenide material that serves as both the switch and storage element for the memory cell.

As illustrated in FIG. 1, a host 102 can be coupled to the memory device 104. In a number of embodiments, the memory device 104 can be coupled to the host 102 via one or more channels (e.g., channel 103). In FIG. 1, the memory device 104 is coupled to the host 102 via channel 103 and acceleration circuitry 120 of the memory device 104 is coupled to the memory array 130 via a channel 107. The host 102 can be a host system such as a personal laptop computer, a desktop computer, a digital camera, a smart phone, a memory card reader, and/or an internet-of-things (IoT) enabled device, among various other types of hosts.

The host 102 can include a system motherboard and/or backplane and can include a memory access device, e.g., a processor (or processing device). One of ordinary skill in the art will appreciate that "a processor" can intend one or more processors, such as a parallel processing system, a number of coprocessors, etc. The system 100 can include separate integrated circuits or both the host 102, the memory device 104, and the memory array 130 can be on the same integrated circuit. The system 100 can be, for instance, a server system and/or a high-performance computing (HPC) system and/or a portion thereof. Although the example shown in FIG. 1 illustrate a system having a Von Neumann architecture, embodiments of the present disclosure can be implemented in non-Von Neumann architectures, which may not include one or more components (e.g., CPU, ALU, etc.) often associated with a Von Neumann architecture The memory device 104, which is shown in more detail in FIG. 2, herein, can include acceleration circuitry 120, which can include a processing device 122 and a memory resource 124. The processing device 122 can be provided in the form of an integrated circuit, such as an application-specific integrated circuit (ASIC), field programmable gate array (FPGA), reduced instruction set computing device (RISC), advanced RISC machine, system-on-a-chip, or other combination of hardware and/or circuitry that is configured to perform operations described in more detail, herein. In some embodiments, the processing device 122 can comprise one or more processors (e.g., processing device(s), processing unit(s), etc.) The processing device 122 can perform recursive operations using bit strings stored by the memory resource 124, the memory array 130, and/or provided by the host 102.

For example, the processing device 122 can be configured to perform (or cause performance of) recursive arithmetic operations such as addition, subtraction, multiplication, division, fused multiply addition, multiply-accumulate, dot product units, greater than or less than, absolute value (e.g., FABS( )), fast Fourier transforms, inverse fast Fourier transforms, sigmoid function, convolution, square root, exponent, and/or logarithm operations, and/or recursive logical operations such as AND, OR, XOR, NOT, etc., as well as trigonometric operations such as sine, cosine, tangent, etc. using the posit bit strings. As will be appreciated, the foregoing list of operations is not intended to be exhaustive, nor is the foregoing list of operations intended to be limiting, and the processing device 122 may be configured to perform (or cause performance of) other arithmetic and/or logical operations.

The processing device 122 can perform operations on results of iterations and/or a final result of the recursive operation(s) to modify a quantity of bits associated with the iterations and/or the final result of the recursive operation(s). In some embodiments, the operations to modify the quantity of bits associated with the results of the iterations and/or the final result of the recursive operation can include scaling the results of the iterations and/or the final result of the recursive operation to modify the quantity of bits associated with the iterations and/or the final result of the recursive operation. In response to modifying the quantity of bits associated with the result of the iteration and/or the final result of the recursive operation, the processing device 122 can be configured to cause the modified result of the iteration and/or the modified final result of the recursive operation to be stored in the quire register 131. In addition, the processing device 122 can cause a factor by which the result of the iteration and/or the final result of the recursive operation was modified to be stored in the factor register 133.

In some embodiments, the processing device 122 can be configured to modify the result of the iteration and/or the final result of the recursive operation by causing the result of the iteration and/or the final result of the recursive operation to be multiplied or divided by $2^X$. In such embodiments, the processing device 122 can then cause the factor X to be stored in the factor register 133. Embodiments are not so limited, however, and the processing device 122 can be configured to modify the result of the iteration and/or the final result of the recursive operation by a different factor and cause the different factor to be stored in the factor register 133.

In some embodiments, the processing device 122 can be configured to modify the result of the iteration and/or the final result of the recursive operation by shifting a decimal point or radix associated with the result of the iteration and/or the final result of the recursive operation a particular number of places to the left or right, as described in more detail in connection with FIGS. 3-5, herein. For example, if the result of the iteration and/or the final result of the recursive operation is stored in a fixed-point format, the processing device 122 can be configured to modify the result of the iteration and/or the final result of the recursive operation by shifting a decimal point or radix associated with the result of the iteration and/or the final result of the recursive operation in one direction or another.

The control circuitry 120 can further include a memory resource 124, which can be communicatively coupled to the processing device 122. The memory resource 124 can include volatile memory resource, non-volatile memory resources, or a combination of volatile and non-volatile memory resources. In some embodiments, the memory resource can be a random-access memory (RAM) such as static random-access memory (SRAM). Embodiments are not so limited, however, and the memory resource can be a cache, one or more registers, NVRAM, ReRAM, FeRAM, MRAM, PCM), "emerging" memory devices such as 3-D Crosspoint (3D XP) memory devices, etc., or combinations thereof.

The memory resource 124 can store one or more bit strings. In some embodiments, the bit string(s) stored by the memory resource 124 can be stored according to a fixed-point format. As used herein, a bit string stored in a fixed-point format can be a real data type corresponding to a number that has a fixed number of digits before and/or after the decimal point or radix point of the bit string. A fixed-point bit string can be a bit string representing an integer that is scaled by an implicit specific factor that can be based on the data type associated with the bit string. For example, the value 7.68 can be represented as 7680 in a fixed-point data type with a scaling factor of 1/1000. Although the preceding example is scaled by a power of ten, embodiments are not so limited, and in some embodiments, the scaling factor can be a power of two, or other suitable scaling factor.

The processing device 122 can be configured to cause performance of an arithmetic operation or a logical operation, or both, using bit strings that can be stored in a fixed-point format. In some embodiments, the arithmetic operation and/or the logical operation can be a recursive operation, as described above. Examples of recursive operations contemplated herein are not limited to the examples described herein, however. To the contrary, the above examples of recursive operations are merely illustrative and are provided to clarify the scope of the term "recursive operation" in the context of the disclosure.

As shown in FIG. 1, a plurality of sense amplifiers (e.g., the sense amps 111) are coupled to a memory array 130 and the control circuitry 120. The control circuitry 120 (e.g., the processing device 122) can be configured to cause performance of a recursive operation using one or more bit strings and/or cause resultant bit strings representing results of modified iterations of the recursive operation to be stored (e.g., accumulated) in the plurality of sense amplifiers and/or in the quire register 131 and/or the factor register 133. For example, the control circuitry 120 can be configured to cause performance of the recursive operation and can, for one or more iterations of the recursive operation, cause the results of the iterations to be modified as described herein. The control circuitry 120 can then cause the modified result of the iteration of the recursive operation to be stored in the sense amps 111 and/or the quire register 131 and can cause the factor by which the result of the iteration was modified to be stored in the sense amps 111 and/or the factor register 133.

In some embodiments, the operation to cause the resultant bit strings to be modified and accumulated in the plurality of sense amplifiers, the quire register 131, and/or the factor register 133 can be performed in response to receipt of a user generated command. Embodiments are not so limited, however, and in some embodiments, the control circuitry 120 can be configured to perform the operation to cause the resultant bit strings to be modified and be accumulated in the plurality of sense amplifiers, the quire register 131, and/or the factor register 133 in response to receipt of a host command or in response to a determination that the bit strings to be used in the recursive operation are stored in the memory resource 124 of the control circuitry 120.

The sense amps 111 can provide additional storage space for the memory array 130 and can sense (e.g., read, store, cache) data values that are present in the memory device 104. In some embodiments, the sense amps 111 can be located in a periphery area of the memory device 104. For example, the sense amps 111 can be located in an area of the memory device 104 that is physically distinct from the memory array 130. The sense amps 111 can include sense amplifiers, latches, flip-flops, etc. that can be configured to stored data values, as described herein. In some embodiments, the sense amps 111 can be provided in the form of a register or series of registers and can include a same quantity of storage locations (e.g., sense amplifiers, latches, etc.) as there are rows or columns of the memory array 130. For example, if the memory array 130 contains around 16K rows or columns, the periphery sense amplifiers 111 can include around 16K storage locations. Accordingly, in some embodiments, the periphery sense amplifiers 111 can be a register that is configured to hold up to 16K data values, although embodiments are not so limited as described in more detail in connection with FIG. 2A.

The control circuitry 120 can be further configured to cause resultant bit strings representing modified results of iterations of the recursive operation to be accumulated in the plurality of sense amplifiers (e.g., the sense amps 111), the quire register 131, and/or the factor register 133 by overwriting a previously stored bit string in the plurality of sense amplifiers and/or the special purpose registers. For example, the control circuitry 120 can be configured to store each modified successive intermediate resultant bit string of the recursive operation in a same location as the preceding modified intermediate bit string is stored. However, as described in more detail below in connection with FIGS. 2A and 2B, successive iterations of the recursive operation may have larger bit widths than preceding iterations of the recursive operation. In this case, the control circuitry 120 can be configured to overwrite the preceding resultant bit string and store additional bits of a subsequent bit string representing a subsequent iteration in additional sense amps 111. In some embodiments, this can be accomplished by dynamically varying the size or number of storage locations available to store iterations of the recursive operations in the plurality of sense amplifiers 111, the quire register 131, and/or the factor register 133. For example, the processing device 122 can be configured to allocate a variable quantity of storage locations in the plurality of sense amplifiers 111, the quire register 131, and/or the factor register 133 to be used to store modified results of iterations of the recursive operation and/or a modified final result of the recursive operation. Embodiments are not so limited, however, and in some embodiments, the quantity of bits associated with each successive iteration of the recursive operation can be modified by a different factor such that the results of the iterations have a same quantity of bits. In embodiments in which the results of successive iterations are modified by different factors, the factors that were used for each iteration can be stored and used to recover the result of the recursive operation upon completion of the recursive operation.

In some embodiments, the control circuitry 120 can be configured to determine that the recursive operation is complete and cause performance of an operation to recover the result of the recursive operation by scaling the modified final result of the recursive operation stored in the quire register 131 with the factor stored in the factor register 133. For example, the control circuitry 120 can be configured to multiply to the modified final result of the recursive operation stored in the quire register 131 with the factor stored in the factor register 133 to recover accuracy and/or precision in the final result of the recursive operation that was temporarily removed during operations to modify the results of the iterations of the recursive operation.

In some embodiments, the control circuitry 120 can be configured to round the resultant bit string stored in the plurality of sense amplifiers, the quire register 131, and/or the factor register 133. For example, once the final result of the recursive operation has been recovered using the control circuitry 120, the control circuitry 120 can cause performance of a rounding operation to truncate the final recovered result of the recursive operation to a desired bit width.

For example, the final result of the recursive operation can be rounded to a particular bit width, such as 8-bits, 16-bits, 32-bits, 64-bits, etc. The particular bit width at which the final result of the recursive operation can be predetermined, or can be selectable by, for example, a user input. For example, in some embodiments, a user can provide a command to the control circuitry 120 that instructs the control circuitry 120 to round the final result of the recursive operation to a desired bit width.

In some embodiments, the recursive operation can be performed within the memory array 130 without transferring the resultant bit strings to circuitry external to the memory device 104. For example, the recursive operation can be performed by the processing device 122 of the control circuitry 120, or by firing rows and columns of the memory array in a particular combination to perform the recursive operation.

In a non-limiting example, the processing resource 122 is coupled to a first register (e.g., the quire register 131) and a second register (e.g., the factor register 133) and is configured to cause performance of a first arithmetic operation, a first logical operation, or both using a first bit string and a second bit string. The processing resource 122 can be configured to reduce a quantity of bits of a result of the first operation by a first factor such that the quantity of bits of the result of the first operation is less than a predetermined threshold quantity of bits. As described above, the factor can be a power of two, a power of ten, or other suitable factor that, when applied to the result of the first operation scales the result of the first operation such that the result of the first operation includes less than a pre-determined threshold quantity of bits. In some embodiments, the pre-determined threshold quantity of bits can correspond to a quantity of storage locations associated with the first register. For example, the threshold quantity of bits can be between 9-bits and 15-bits, although embodiments are not limited to this particular range.

The processing device 122 can then cause the result of the first operation having the reduced quantity of bits to be stored in the first register and cause the first factor to be stored in the second register. Continuing with this particular non-limiting example, if the processing device 122 is performing the first operation as part of a recursive operation, the processing device can be further configured to cause performance of a second arithmetic operation, a second logical operation, or both using the result of the first operation or the result of the first operation having the reduced quantity of bits and a third bit string. The processing device 122 can then reduce a quantity of bits of a result of the second operation by a second factor such that the quantity of bits of the result of the second operation is less than the predetermined threshold quantity of bits and cause the result of the second operation having the reduced quantity of bits to be stored in the first register and cause the second factor to be stored in the second register.

In some embodiments, the processing device 122 can be configured to perform an operation using the result of the second operation having the reduced quantity of bits and the first factor, the second factor, or both, to recover the result of the second operation. For example, the processing device 122 can be configured to multiply the factor stored in the second register and the result of the second operation stored in the first register to obtain a final result of the recursive operation.

The processing device 122 can, in some embodiments, be configured to determine a quantity of bits associated with the first operation, the second operation, or both and set a quantity of bits for use by the first register to a quantity of bits substantially equal to the quantity of bits associated with the first operation, the second operation, or both. That is, in some embodiments, the processing device 122 can cause an amount of storage locations available, either in the quire register 131, the sense amps 111, or both, to be scaled (e.g., increased or decreased) to accommodate results of iterations of the recursive operation that are larger or smaller than an initial quantity of storage locations reserved for storing results of iterations of the recursive operation. For example, if 10-bits are reserved in the quire register 131 and/or the sense amps 111 to store a modified result of an iteration of the recursive operation and a higher degree of accuracy or precision is desired in the result of the operation, the processing device 122 can be configured to allocate a larger quantity (e.g., 16-bits, 32-bits, etc.) of available storage locations in the quire register 131 and/or the sense amps 111 for storing the modified results of the iterations of the recursive operation.

As described above, the processing device 122 can be configured to reduce the quantity of bits of the result of the first operation, reduce the quantity of bits of the second operation, or both, by shifting a decimal point associated with the result of the first operation, reduce the quantity of bits of the second operation, or both. Embodiments are not limited to shifting a decimal point associated with the result of the operation, however, and in some embodiments, the quantity of bits of the result of the first operation, the second operation, or both, can be reduced by shifting a binary point (if the data is stored as fixed-point binary), or other suitable radix point depending on the format in which the data is stored. For example, the processing device 122 can cause a decimal point associated with a fixed-point number corresponding to the result of the first operation, the result of the second operation, or both to be moved a particular number of places to the left or right as part of reducing the quantity of bits associated with the result of the first operation, the result of the second operation, or both. Embodiments are not so limited, however, and in some embodiments, the processing device 122 can be configured to multiply the result of the first operation, the result of the second operation, or both by $2^X$, where X corresponds to the first factor and/or the second factor.

In some embodiments, the processing device 122 can be configured to perform an operation using the result of the second operation having the reduced quantity of bits and the factor to recover the result of the second operation and perform an operation to convert the recovered result of the second operation to a format different than a format in which the first operation or the second operation is performed. For example, if the first operation and/or the second operation are performed using bit strings that are formatted according to a fixed point format, the processing device 122 can be configured to perform an operation to convert the final result of the recursive operation to a different format, such as a floating-point format, a universal number format, or other suitable format.

The embodiment of FIG. 1 can include additional circuitry that is not illustrated so as not to obscure embodiments of the present disclosure. For example, the memory device 104 can include address circuitry to latch address signals provided over I/O connections through I/O circuitry. Address signals can be received and decoded by a row decoder and a column decoder to access the memory device 104 and/or the memory array 130. It will be appreciated by those skilled in the art that the number of address input connections can depend on the density and architecture of the memory device 104 and/or the memory array 130.

Figure 2A:
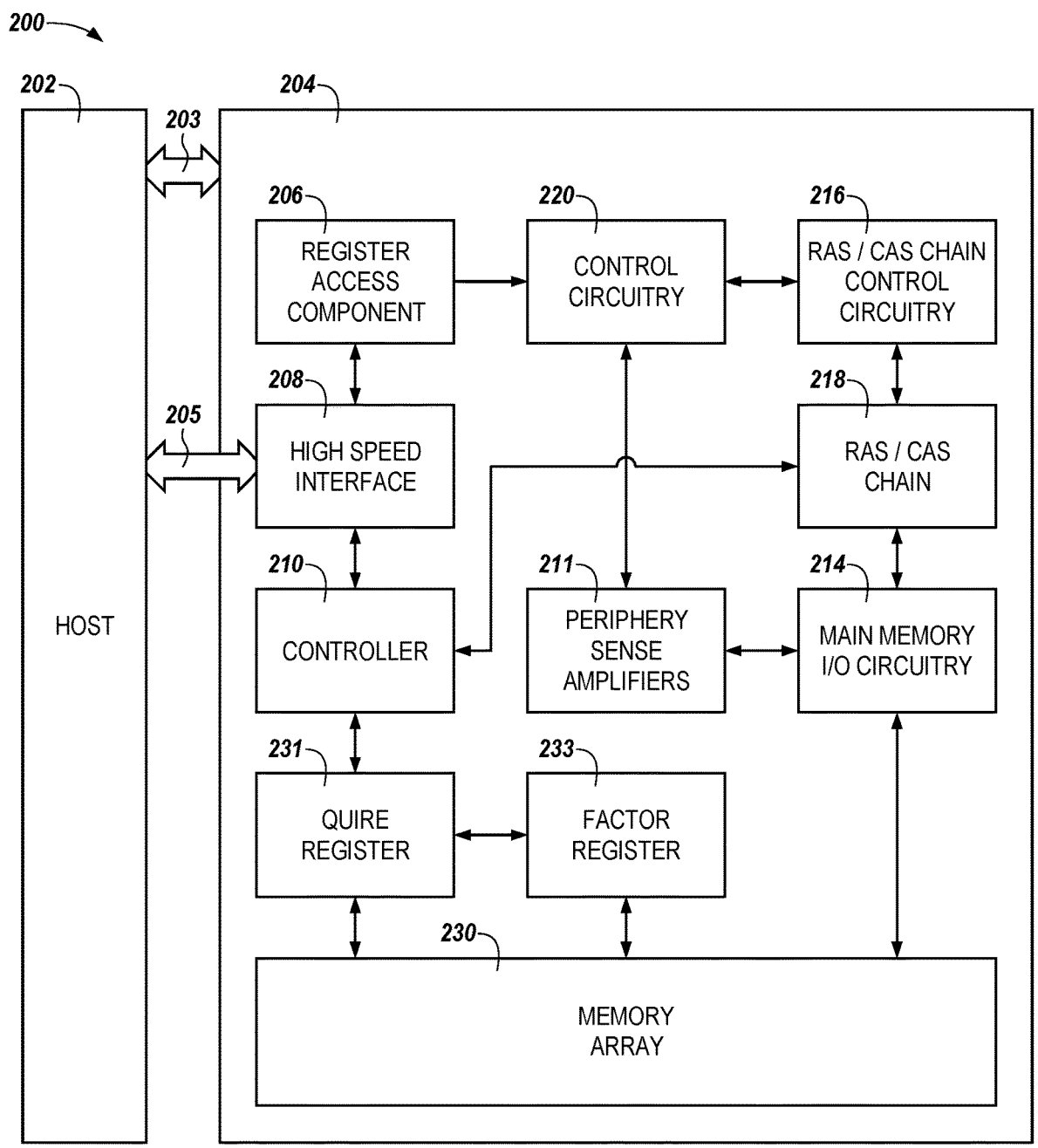
FIG. 2A is a functional block diagram in the form of a computing system including an apparatus including a host and a memory device in accordance with a number of embodiments of the present disclosure.

FIG. 2A is a functional block diagram in the form of a computing system including an apparatus 200 including a host 202 and a memory device 204 in accordance with a number of embodiments of the present disclosure. The memory device 204 can include control circuitry 220, which can be analogous to the control circuitry 120 illustrated in FIG. 1. Similarly, the host 202 can be analogous to the host 102 illustrated in FIG. 1, and the memory device 204 can be analogous to the memory device 104 illustrated in FIG. 1. Each of the components (e.g., the host 202, the control circuitry 220, and/or the memory array 230, etc.) can be separately referred to herein as an "apparatus."

The host 202 can be communicatively coupled to the memory device 204 via one or more channels 203, 205. The channels 203, 205 can be interfaces or other physical connections that allow for data and/or commands to be transferred between the host 202 and the memory device 205. For example, commands to cause initiation of an operation (e.g., an operation to initiate a recursive operation using one or more bit strings, an operation to modify a result of an iteration of the recursive operation, an operation to store the modified result of an iteration of the recursive operation and a factor by which the result of the iteration of the recursive operation was modified in the periphery sense amplifiers 211, the quire register 231, and/or the factor register 242) to be performed using the control circuitry 220 can be transferred from the host via the channels 203, 205. It is noted that, in some embodiments, the control circuitry 220 can perform the operations in response to an initiation command transferred from the host 202 via one or more of the channels 203, 205 in the absence of an intervening command from the host 202. That is, once the control circuitry 220 has received the command to initiate performance of an operation from the host 202, the operations can be performed by the control circuitry 220 in the absence of additional commands from the host 202.

As shown in FIG. 2A, the memory device 204 can include a register access component 206, a high speed interface (HSI) 208, a controller 210, periphery sense amplifiers 211, which can include one or more extended row address (XRA) component(s), main memory input/output (I/O) circuitry 214, row address strobe (RAS)/column address strobe (CAS) chain control circuitry 216, a RAS/CAS chain component 218, control circuitry 220, a quire register 231, a factor register 233, and a memory array 230. The periphery sense amplifiers 211, the control circuitry 220, the quire register 231, and/or the factor register 233 are, as shown in FIG. 2, located in an area of the memory device 204 that is physically distinct from the memory array 230. That is, in some embodiments, the periphery sense amplifiers 211 and/or the control circuitry 220 are located in a periphery location of the memory array 230.

The register access component 206 can facilitate transferring and fetching of data from the host 202 to the memory device 204 and from the memory device 204 to the host 202. For example, the register access component 206 can store addresses (or facilitate lookup of addresses), such as memory addresses, that correspond to data that is to be transferred to the host 202 from the memory device 204 or transferred from the host 202 to the memory device 204. In some embodiments, the register access component 206 can facilitate transferring and fetching data that is to be operated upon by the control circuitry 220 and/or the register access component 206 can facilitate transferring and fetching data that is has been operated upon by the control circuitry 220, or in response to an action taken by the control circuitry 220, for transfer to the host 202.

The HSI 208 can provide an interface between the host 202 and the memory device 204 for commands and/or data traversing the channel 205. The HSI 208 can be a double data rate (DDR) interface such as a DDR3, DDR4, DDR5, etc. interface. Embodiments are not limited to a DDR interface, however, and the HSI 208 can be a quad data rate (QDR) interface, peripheral component interconnect (PCI) interface (e.g., a peripheral component interconnect express (PCIe)) interface, or other suitable interface for transferring commands and/or data between the host 202 and the memory device 204.

The controller 210 can be responsible for executing instructions from the host 202 and accessing the control circuitry 220 and/or the memory array 230. The controller 210 can be a state machine, a sequencer, or some other type of controller. The controller 210 can receive commands from the host 202 (via the HSI 208, for example) and, based on the received commands, control operation of the control circuitry 220 and/or the memory array 230. In some embodiments, the controller 210 can receive a command from the host 202 to cause performance of an operation using the control circuitry 220. Responsive to receipt of such a command, the controller 210 can instruct the control circuitry 220 to begin performance of the operation(s). As described herein, such operations can include recursive operations using bit strings and/or operations to modify results of iterations of the recursive operation by scaling the results of the iterations by a factor. In some embodiments, the operations can further include causing the modified results of the iterations to be stored in the quire register 231 and the factor by which the result of the iterations are scaled to be stored in the factor register 233.

In some embodiments, the controller 210 can be a global processing controller and may provide power management functions to the memory device 204. Power management functions can include control over power consumed by the memory device 204 and/or the memory array 230. For example, the controller 210 can control power provided to various banks of the memory array 230 to control which banks of the memory array 230 are operational at different times during operation of the memory device 204. This can include shutting certain banks of the memory array 230 down while providing power to other banks of the memory array 230 to optimize power consumption of the memory device 230. In some embodiments, the controller 210 controlling power consumption of the memory device 204 can include controlling power to various cores of the memory device 204 and/or to the control circuitry 220, the memory array 230, etc.

As mentioned above, the peripheral sense amplifiers 211 can provide additional storage space for the memory array 230 and can sense (e.g., read, store, cache) data values that are present in the memory device 204. The periphery sense amplifiers 211 can include sense amplifiers, latches, flip-flops, extended row address (XRA) component(s), etc. that can be configured to store data values (e.g., bit strings), as described herein. As shown in FIG. 2A, the peripheral sense amplifiers 211 are in a location of the memory device 204 that is physically distinct from the memory array 230. In some embodiments, the periphery sense amplifiers 211 can be provided in the form of a register or series of registers and can include a same quantity of storage locations (e.g., sense amplifiers, latches, etc.) as there are rows or columns of the memory array 230. For example, if the memory array 230 contains around 16K rows or columns, the periphery sense amplifiers 211 can include around 16K storage locations. Accordingly, in some embodiments, the periphery sense amplifiers 211 can be a register that is configured to hold up to around 16K data values.

However, embodiments are not limited to scenarios in which the periphery sense amplifiers 211 include around 16K location in which to store data values. For example, the periphery sense amplifiers 211 can be configured to store around 2K data values, around 4K data values, around 8K data values, etc. Further, although a single box is shown as illustrating the peripheral sense amplifiers 211 in FIG. 2A, in some embodiments there can be more that a single "row" of peripheral sense amplifiers 211. For example, there may be two, four, or eight, among other quantities, of "rows" of peripheral sense amplifiers 211 that can each be configured to store around 2K data values, around 4K data values, around 8K data values, around 16K data values, etc.

The quire register 231 and the factor register 233 can be provided in the form of a register or series of registers and can have a fixed or variable quantity of storage location associated therewith. In some embodiments, the quire register can include ten storage locations such that a 10-bit wide bit string can be stored therein. Embodiments are not so limited, however, and in some embodiments, the quire register 231 can include fewer storage locations (e.g., eight storage locations, four storage locations, etc.) or a greater quantity of storage locations (e.g., fourteen storage locations, sixteen storage locations, sixty-four storage locations, etc.).

In a simplified, non-limiting example in which the recursive operation comprises a recursive multiplication operation in which a number 2.51 is recursively multiplied with a number 3.73, the result of the first iteration may be 9.3623. In this example, the result of the first iteration includes five digits and can be stored, for example, in five storage locations of the quire register 231 (e.g., the storage locations 332-1, 332-2, 333-3, 333-4, and 333-5 of the quire register 331 illustrated in FIG. 3). The result of the second iteration (e.g., the result of multiplication between the first result 9.3623 and 3.73) can be 34.921379, which includes eight digits. In some embodiments, the result of the second iteration can be stored in eight storage locations of the quire register 231 by, for example, overwriting the result of the first iteration that are stored in the first five storage locations of the quire register 231 and writing the additional three digits to three other storage locations in the quire register 231 (e.g., the storage locations 332-6, 332-7, and 332-8 of the quire register 331 illustrated in FIG. 3). In some embodiments, the result of the second iteration can be scaled by a factor of one such that the value stored in the quire register 231 is 3.4921379 and the value stored by the factor register is one (1) corresponding to a base ten scaling of $10^X$ where X=1.

The result of a third iteration (e.g., the result of multiplication between the second result 34.921379 and 3.73) can be 130.25674367, which includes eleven digits. In embodiments in which the quire register 231 includes ten storage locations (and can therefore accommodate a bit string having ten digits), the result of the third iteration of the recursive operation can be modified to reduce the length of the bit string to ten digits. In order to scale the result of the third iteration to ten digits, the result of the third iteration can be scaled by a factor of $10^X$, where X=2 to cause the decimal point to be moved two places to the left. This can yield a modified result of the third iteration that is represented as 1.302567436 that is scaled by a factor of $10^X$, where X=2. The control circuitry 220 can cause the modified result of the third iteration to be stored in the first ten storage locations of the quire register 231 and the factor two (2) to be stored in the factor register 233. It will be appreciated that, because the above simplified example is presented for clarity in decimal notation, that the scale factor is provided in base ten (10); however, in embodiments in which the recursive operation is performed using binary bit strings (e.g., fixed-point binary bit strings), as described in more detail below, the scale factor could be provided in base two (2) such that the results of the iterations are scaled by a factor of $2^X$, where X corresponds to the value stored by the factor register 233.

In addition to the ten storage locations to store a bit string having ten bits, an additional storage location can be provided to store a sign bit corresponding to the sign (e.g., positive or negative) of the result of the iteration, as described in more detail in connection with FIG. 3, herein. Accordingly, in some embodiments, the quire register 231 can include eleven storage locations to store a ten-bit result of an iteration of a recursive operation, as well as a sign bit corresponding to the result of the iteration. Embodiments are not so limited, however, and the quire register 231 can include any desired quantity of storage locations (e.g., 8-bits, 14-bits, 32-bits, 64-bits, 2016-bits, etc.) to accommodate results of iterations of the recursive operation and/or an additional storage location to store the sign bit corresponding to the result of the iteration.

In some embodiments, access to the periphery sense amplifiers 211, the quire register 231, and/or the factor register 233 can be controlled using a register mapping. For example, bit strings can be stored in, and deleted from, the periphery sense amplifiers 211, the quire register 231, and/or the factor register 233, and/or the bit width of bit strings stored in the periphery sense amplifiers 211, the quire register 231, and/or the factor register 233 can be altered in response to commands associated with a registry mapping that can be stored in the control circuitry 220. In addition, bit strings stored in the memory array 230 can be added to or subtracted from (e.g., accumulated with) bit strings stored in the periphery sense amplifiers 211, the quire register 231, and/or the factor register 233 in response to commands associated with the control circuitry 220.

The main memory input/output (I/O) circuitry 214 can facilitate transfer of data and/or commands to and from the memory array 230. For example, the main memory I/O circuitry 214 can facilitate transfer of bit strings, data, and/or commands from the host 202 and/or the control circuitry 220 to and from the memory array 230. In some embodiments, the main memory I/O circuitry 214 can include one or more direct memory access (DMA) components that can transfer the bit strings (e.g., posit bit strings stored as blocks of data) from the control circuitry 220 to the memory array 230, and vice versa.

In some embodiments, the main memory I/O circuitry 214 can facilitate transfer of bit strings, data, and/or commands from the memory array 230 to the control circuitry 220 so that the control circuitry 220 can perform operations on the bit strings. Similarly, the main memory I/O circuitry 214 can facilitate transfer of bit strings that have had one or more operations performed on them by the control circuitry 220 to the memory array 230.

As described above, bit strings (e.g., the data) can be stored and/or retrieved from the memory array 230. In some embodiments, the main memory I/O circuitry 214 can facilitate storing and/or retrieval of the bit strings to and/or from the memory array 230. For example, the main memory I/O circuitry 214 can be enabled to transfer bit strings to the memory array 230 to be stored, and/or the main memory I/O circuitry 214 can facilitate retrieval of the bit strings (e.g., bit strings representing a performed operation between one or more bit string operands, modified results of iterations of operations performed between one or more bit string operands, etc.) from the memory array 230 in response to, for example, a command from the controller 210 and/or the control circuitry 220.

The row address strobe (RAS)/column address strobe (CAS) chain control circuitry 216 and the RAS/CAS chain component 218 can be used in conjunction with the memory array 230 to latch a row address and/or a column address to initiate a memory cycle. In some embodiments, the RAS/CAS chain control circuitry 216 and/or the RAS/CAS chain component 218 can resolve row and/or column addresses of the memory array 230 at which read and write operations associated with the memory array 230 are to be initiated or terminated. For example, upon completion of an operation using the control circuitry 220, the RAS/CAS chain control circuitry 216 and/or the RAS/CAS chain component 218 can latch and/or resolve a specific location in the periphery sense amplifiers 211, the quire register 231, the factor register 233, and/or the memory array 230 to which the bit strings that have been operated upon by the control circuitry 220 are to be stored. Similarly, the RAS/CAS chain control circuitry 216 and/or the RAS/CAS chain component 218 can latch and/or resolve a specific location in the periphery sense amplifiers 211, the quire register 231, and/or the factor register 233, and/or the memory array 230 from which bit strings are to be transferred to the control circuitry 220 prior to, or subsequent to, the control circuitry 220 performing an operation (e.g., a recursive operation) using the bit string(s).

The control circuitry 220 can include a processing device (e.g., the processing device 122 illustrated in FIG. 1) and/or memory resource(s) (e.g., the memory resource 124 illustrated in FIG. 1). Bit strings (e.g., data, a plurality of bits, etc.) can be received by the control circuitry 220 from, for example, the host 202, the memory array 230, and/or an external memory device and stored by the control circuitry 220, for example in the memory resource of the control circuitry 220. The control circuitry (e.g., the processing device of the control circuitry 220) can perform recursive operations (or cause operations to be performed) using the bit string(s), modify the results of iterations of the recursive operations, and cause the modified intermediate results of the operations to be stored in the periphery sense amplifiers 211, the quire register 231, and/or the factor register 233.

In some embodiments, the control circuitry 220 can perform (or cause performance of) recursive arithmetic and/or logical operations using the bit strings. For example, the control circuitry 220 can be configured to perform (or cause performance of) recursive arithmetic operations such as recursive additions, recursive subtractions, recursive multiplications, recursive divisions, fused multiply addition operations, multiply-accumulate operations, recursive dot product operations, greater than or less than, absolute value (e.g., FABS( )), fast Fourier transforms, inverse fast Fourier transforms, sigmoid function operations, convolution operations, recursive square root operations, recursive exponent operations, and/or recursive logarithm operations, and/or recursive logical operations such as AND, OR, XOR, NOT, etc., as well as recursive trigonometric operations such as sine, cosine, tangent, etc. As will be appreciated, the foregoing list of operations is not intended to be exhaustive, nor is the foregoing list of operations intended to be limiting, and the control circuitry 220 may be configured to perform (or cause performance of) other arithmetic and/or logical operations using various bit strings.

In some embodiments, the control circuitry 220 may perform the above-listed operations in conjunction with execution of one or more machine learning algorithms. For example, the control circuitry 220 may perform operations related to one or more neural networks. Neural networks may allow for an algorithm to be trained over time to determine an output response based on input signals. For example, over time, a neural network may essentially learn to better maximize the chance of completing a particular goal. This may be advantageous in machine learning applications because the neural network may be trained over time with new data to achieve better maximization of the chance of completing the particular goal. A neural network may be trained over time to improve operation of particular tasks and/or particular goals. However, in some approaches, machine learning (e.g., neural network training) may be processing intensive (e.g., may consume large amounts of computer processing resources) and/or may be time intensive (e.g., may require lengthy calculations that consume multiple cycles to be performed).

In contrast, by performing such operations and modifying results of iterations of the operations, as described herein using the control circuitry 220, the amount of processing resources and/or the amount of time consumed in performing the operations may be reduced in comparison to approaches in which such operations are performed and results of the operations are rounded or truncated at each iteration. Further, by storing modified intermediate results of the recursive operations in the periphery sense amplifiers 211, the quire register 231, and/or the factor register 233, the accuracy of a bit string that represents the final result of the recursive operation may be higher in comparison to approaches that truncate intermediate results of recursive operations or in approaches in which intermediate results of recursive operations are stored in a hidden scratch area.

In some embodiments, the controller 210 can be configured to cause the control circuitry 220 to perform operations using bit strings without encumbering the host 202 (e.g., without receiving an intervening command or a command separate from a command to initiate performance of the operation from the host 202 and/or without transferring results of the operations to the host 202). Embodiments are not so limited, however, and in some embodiments, the controller 210 can be configured to cause the control circuitry 220 (e.g., the logic circuitry) to perform recursive arithmetic and/or recursive logical operations using bit strings, store intermediate results of such operations in the periphery sense amplifiers 211 and/or round the final result of the recursive operation (which may be stored in the periphery sense amplifiers 211 and/or the XRA component(s)) such that the final result of the recursive operation has a particular bit width associated therewith.

For example, the control circuitry 220 can be configured to cause performance of a recursive operation using the one or more bit strings and/or cause successive resultant bit strings that each represent a result of a corresponding iteration of the recursive operation to be accumulated (e.g., stored) in the periphery sense amplifiers 211 (e.g., a plurality of sense amplifiers). In some embodiments, the control circuitry 220 can be further configured to cause each successive resultant bit string to be accumulated in the plurality of sense amplifiers 211 by overwriting a preceding resultant bit string stored in the plurality of sense amplifiers 211, as described below.

Further, as described above, the periphery sense amplifiers 211 can be located in a periphery of the memory array 230. That is, in some embodiments, the periphery sense amplifiers 211 can be located in an area of the memory device 204 that is physically distinct from an area in which the memory array 230 is located.

In some embodiments, the performance of the recursive operation can include performing an arithmetic operation, a logical operation, a bit-wise operation, a vector operation, or combinations thereof. In response to a determination that the recursive operation is completed, the control circuitry 220 can be configured to cause a last resultant bit string stored in the plurality of sense amplifiers 211 to be rounded (e.g., truncated) such that the last resultant bit string has a particular bit width. For example, the control circuitry 220 can cause the last resultant bit string stored in the plurality of sense amplifiers 211 to be rounded off to have a bit width of 8-bits, 16-bits, 32-bits, 64-bits, etc. In some embodiments, the last resultant bit string can be rounded after an operation to recover the final result by applying the factor stored in the factor register 233 to the modified result stored in the quire register 231.

As described above in connection with FIG. 1, the memory array 230 can be a DRAM array, SRAM array, STT RAM array, PCRAM array, TRAM array, RRAM array, NAND flash array, and/or NOR flash array, for instance, although embodiments are not limited to these particular examples. The memory array 230 can function as main memory for the computing system 200 shown in FIGS. 2A and 2B. In some embodiments, the memory array 230 can be configured to store bit strings operated on by the control circuitry 220 (e.g., bit strings that represent a final result of a performed recursive operation) and/or store bit strings to be transferred to the control circuitry 220 prior to performance of operations using the bit strings.

In some embodiments, bit strings can be generated and/or stored in the memory array 230 without encumbering the host 202. For example, the bit strings can be generated and/or stored in the memory array 230 without receiving multiple commands from the host 202. Stated alternatively, in some embodiments, the host 202 can send a single command to the memory device to request performance of an operation using one or more bit strings. Responsive to receipt of the command to request performance of the operation, the memory device 204 (e.g., the controller 210, the control circuitry 220, or other components of the memory device 204) can perform the operation, modify results of iterations of the operation, store the modified result in the quire register 231 and the factor by which the result of iteration was modified in the factor register 233, and/or retrieve a stored result of the operation in the absence of additional commands from the host 202. This can reduce traffic across the channels 203/205, which can increase performance of a computing device associated with the host 202 and/or the memory device 204.

Figure 2B:
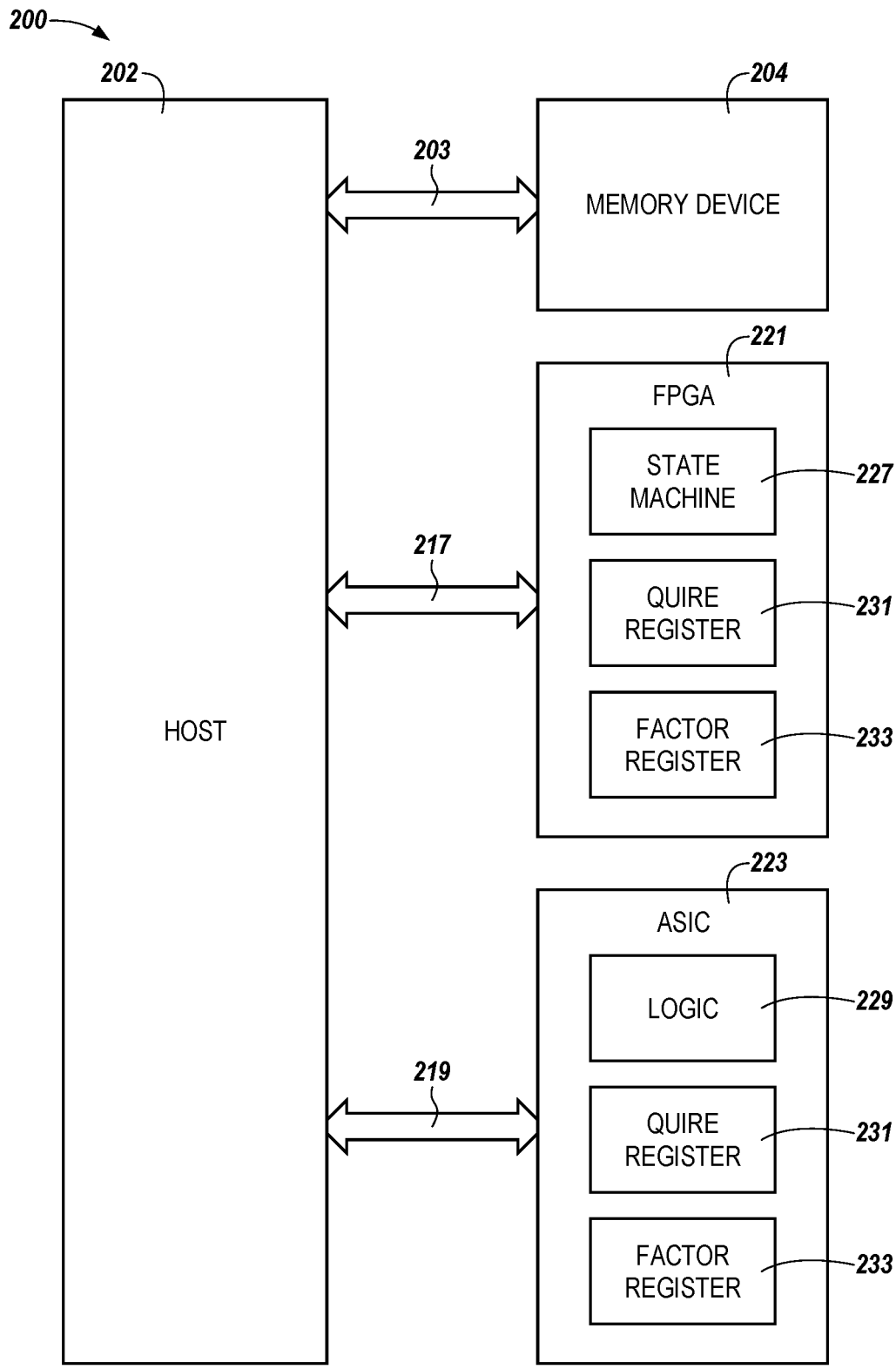
FIG. 2B is another functional block diagram in the form of a computing system including a host, a memory device, an application-specific integrated circuit, and a field programmable gate array in accordance with a number of embodiments of the present disclosure.

FIG. 2B is a functional block diagram in the form of a computing system 200 including a host 202, a memory device 204, an application-specific integrated circuit 223, and a field programmable gate array 221 in accordance with a number of embodiments of the present disclosure. Each of the components (e.g., the host 202, the memory device 204, the FPGA 221, the ASIC 223, etc.) can be separately referred to herein as an "apparatus."

As shown in FIG. 2B, the host 202 can be coupled to the memory device 204 via channel(s) 203, which can be analogous to the channel(s) 203 illustrated in FIG. 2A. The field programmable gate array (FPGA) 221 can be coupled to the host 202 via channel(s) 217 and the application-specific integrated circuit (ASIC) 223 can be coupled to the host 202 via channel(s) 219. In some embodiments, the channel(s) 217 and/or the channel(s) 219 can include a peripheral serial interconnect express (PCIe) interface, however, embodiments are not so limited, and the channel(s) 217 and/or the channel(s) 219 can include other types of interfaces, buses, communication channels, etc. to facilitate transfer of data between the host 202 and the FPGA 221 and/or the ASIC 223.

As described above, circuitry located on the memory device 204 (e.g., the control circuitry 220 illustrated in FIG. 2A) can perform recursive operations using bit strings as operands and can cause intermediate results of the recursive operations to be stored in a peripheral location (e.g., the quire register 231, and/or the factor register 233). Embodiments are not so limited, however, and in some embodiments, the recursive operation(s) can be performed by the FPGA 221 and/or the ASIC 223. In embodiments in which the FPGA 221 and/or the ASIC 223 are configured to perform the recursive operations, the FPGA and/or the ASIC 223 can be configured to cause intermediate results of the recursive operations to be modified and/or stored in the memory device 204, for example in the quire register 231 and/or factor register 233.

As described above, non-limiting examples of recursive arithmetic and/or recursive logical operations that can be performed by the FPGA 221 and/or the ASIC 223 include arithmetic operations such as addition, subtraction, multiplication, division, fused multiply addition, multiply-accumulate, dot product units, greater than or less than, absolute value (e.g., FABS( )), fast Fourier transforms, inverse fast Fourier transforms, sigmoid function, convolution, square root, exponent, and/or logarithm operations, and/or logical operations such as AND, OR, XOR, NOT, etc., as well as trigonometric operations such as sine, cosine, tangent, etc. using the posit bit strings.

The FPGA 221 can include a state machine 227, a quire register 231, and/or a factor register 233. The state machine 227 can include one or more processing devices that are configured to perform operations on an input and produce an output. For example, the FPGA 221 can be configured to receive posit bit strings from the host 202 or the memory device 204 and perform one or more recursive operations using bit strings as operands. After each iteration of the recursive operation is complete, the FPGA 221 can cause a bit string that represent the result of the iteration to be modified as described herein, cause the modified result to be stored in the quire register 231 and the factor by which the result was modified to be stored in the factor register 233.

The FPGA 221 can include registers and/or buffers that can be configured to buffer and/or store the bit strings received form the host 202 prior to the state machine 227 performing a recursive operation using the received bit strings. In addition, the register and/or buffers of the FPGA 221 can be configured to buffer and/or store intermediate results of iterations of the recursive operation prior to the results being modified as described herein.

The ASIC 223 can include logic 229, a quire register 231, and/or a factor register 233. The logic 229 can include circuitry configured to perform operations on an input and produce an output. In some embodiments, the ASIC 223 is configured to receive bit strings from the host 202 and/or the memory device 204 and perform one or more recursive operations using bit string operands, modify results of iterations of the recursive operations, and cause the modified result of the iterations to be stored in the quire register 231 and the factor by which the result of the iteration was modified to be stored in the factor register 233.

The ASIC 223 can include a cache that can be configured to buffer and/or store the bit strings received from the host 202 prior to the logic 229 performing an operation on the received bit strings. In addition, the cache of the ASIC 223 can be configured to buffer and/or store intermediate results of iterations of the recursive operation prior to the results being modified as described herein.

Figure 3A:
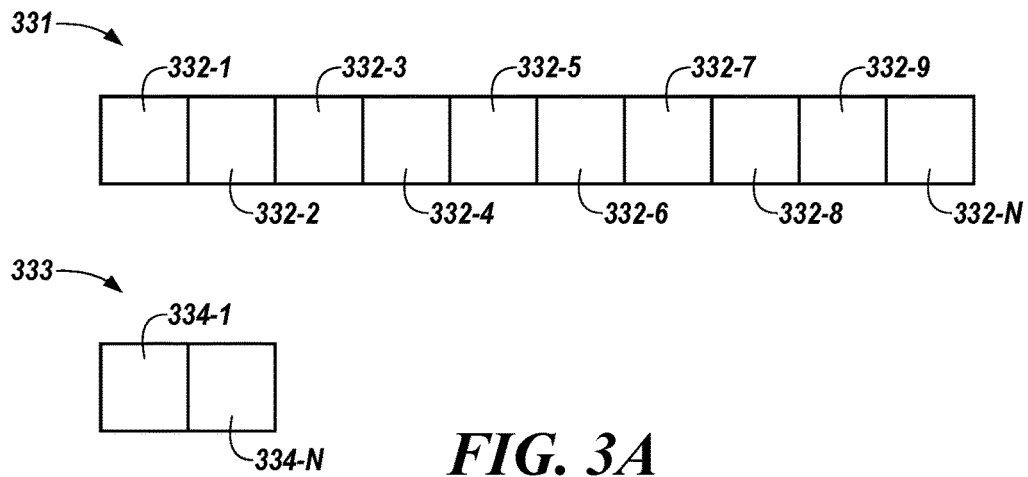
FIG. 3A is a block diagram in the form of a quire register and a factor register in accordance with a number of embodiments of the present disclosure.

FIG. 3A is a block diagram in the form of a quire register 331 and a factor register 333 in accordance with a number of embodiments of the present disclosure. As shown in FIG. 3, the quire register 331 can include a quantity of storage locations 332-1, 332-2, 332-3, 332-4, 332-5, 332-6, 332-7, 332-8, 332-9, . . . 332-N, which can be configured to store values corresponding to a result of an iteration of a recursive operation (e.g., a modified result of a recursive operation). Although shown as ten distinct storage locations in FIG. 3A, embodiments are not so limited, and any non-zero quantity of storage locations can be provided to facilitate embodiments of the disclosure.

In addition to the quire register 331, FIG. 3A illustrates a factor register 333 that can include a quantity of storage locations 334-1, . . . , 334-N. The storage locations 334-1, . . . , 334-N of the factor register 333 can be configured to store a factor by which the result of an iteration of a recursive operation that is stored in the quire register 331 has been modified. Although shown as two distinct storage locations in FIG. 3A, embodiments are not so limited, and any non-zero quantity of storage locations can be provided to facilitate embodiments of the disclosure.

Table 1 illustrates a non-limiting example of bit string accumulation in accordance with embodiments of the disclosure. In the example shown in Table 1, the quire register 331 effectively acts as an accumulation register for a recursive dot product operation. In order to clearly illustrate the example of Table 1, the quire register 331 is a register that includes ten bits to store a 10-bit scaled result of each iteration of the recursive dot product operation and one bit to store a sign bit corresponding to the sign of the result of the iteration stored in the quire register 331. In some embodiments, the sign bit can be stored in a first register location (e.g., in the storage location 332-1) of the quire register 331, and the next ten storage locations (e.g., the storage locations 332-2, . . . , 332-N, where the $N^{th}$ storage location is an eleventh storage location of the quire register 331) can be configured to store the scaled 10-bit value of iterations of the recursive operation.

TABLE 1

| Input Product | Accumulation Result of Input Product and Previous Iteration's Scaled Quire Register | Scaled Quire Register Sign Bit | Scaled Quire Register (10-Bits) | Factor Register Value |
|---|---|---|---|---|
| | | 0 | 0000000000 | +0 |
| +111001110.1011 | 111001110.1 (011) | 0 | 1110011101 | +8 |
| +110000000001.000001 | 1101110011 (11.100001) | 0 | 1101110100 | +11 |
| −110111001111.1111 | 0.0001 | 0 | 1000000000 | −4 |
| −111.0 | −110.1111 | 1 | 1101111000 | +2 |
| −1111111110000000.0 | −111111111 (0000110.1111) | 1 | 1111111111 | +16 |

In the second row of Table 1 (e.g., before the recursive operation is initiated), the quire register 331 can store a 10-bit binary number corresponding to zero. The scaled quire register sign bit can be zero, and the factor register 333 can store a value of zero. In the third row of Table 1, the first input product can be received (e.g., by the control circuitry 120 illustrated in FIG. 1) and after being accumulated with zero (the initial quire register contents), the result which is equivalent to the first input product, can be scaled to a 10-bit binary fixed-point number that can be stored in the quire register 331. For example, the initial accumulation result, 111001110.1011, contains 13 bits, so the first accumulation result can be scaled to a 10-bit fixed-point binary number (e.g., 111001110.1) and stored in the quire register 331. If the initial accumulation result is scaled by a factor of $2^X$, as described above, the factor register 333 can store a value of +8 (e.g., a value of 1000 in fixed-point binary).

In the fourth row of Table 1, the value stored in the quire register 331 in the third row (e.g., 111001110.1) can be accumulated with a second input product, 110000000001.000001. The result of this iteration is 110111001111.100001, which contains 18 bits. As shown in the fourth row of Table 1, this result can be scaled to a 10-bit fixed-point binary number (e.g., 1101110100) and stored in the quire register 331, and a value of +11 (e.g., a value of 1011 in fixed-point binary) that corresponds to the factor by which the result of the iteration is modified can be stored in the factor register 333.

In the fifth row of Table 1, the value stored in the quire register 331 in the fourth row (e.g., 1101110100) can be accumulated with a third input product, −110111001111.1111. The result of this iteration is 0.0001, which contains 5 bits. As shown in the fifth row of Table 1, this result can be scaled to a 10-bit fixed-point binary number (e.g., 1000000000) and stored in the quire register 331, and a value of −4 (e.g., a value of −100 in fixed-point binary) that corresponds to the factor by which the result of the iteration is modified can be stored in the factor register 333.

In the sixth row of Table 1, the value stored in the quire register 331 in the fifth row (e.g., 1000000000) can be accumulated with a fourth input product −111.0. The result of this iteration is −110.1111, which contains 7 bits. As shown in the sixth row of Table 1, this result can be scaled to a 10-bit fixed-point binary number (e.g., 110.1111000) and stored in the quire register 331, and a value of +2 (e.g., a value of 10 in fixed-point binary) that corresponds to the factor by which the result of the iteration is modified can be stored in the factor register 333.

In the seventh row of Table 1, the value stored in the quire register 331 in the sixth row (e.g., 110.1111000) can be accumulated with a fifth input product −1111111110000000.0. The result of this iteration is −1111111110000110.1111, which contains 21 bits. As shown in the seventh row of Table 1, this result can be scaled to a 10-bit fixed-point binary number (e.g., 1111111111) and stored in the quire register 331, and a value of +16 (e.g., a value of 10000 in fixed-point binary) that corresponds to the factor by which the result of the iteration is modified can be stored in the factor register 333.

The values described above that are stored in the factor register 333 can include a quantity of bits that is based on the shape or bit width of the resulting bit string that will be output upon completion of the recursive operation. In some embodiments, the quantity of bits allocated to the factor register 333 can be based on an application for which the recursive operation is performed and can be user selectable or dynamically allocated based on the application. In addition, the value of the factor stored in the factor register 333 can be stored in a signed integer binary format, fixed-point binary format, a floating-point format, or other suitable format based on the application.

Figure 3B:
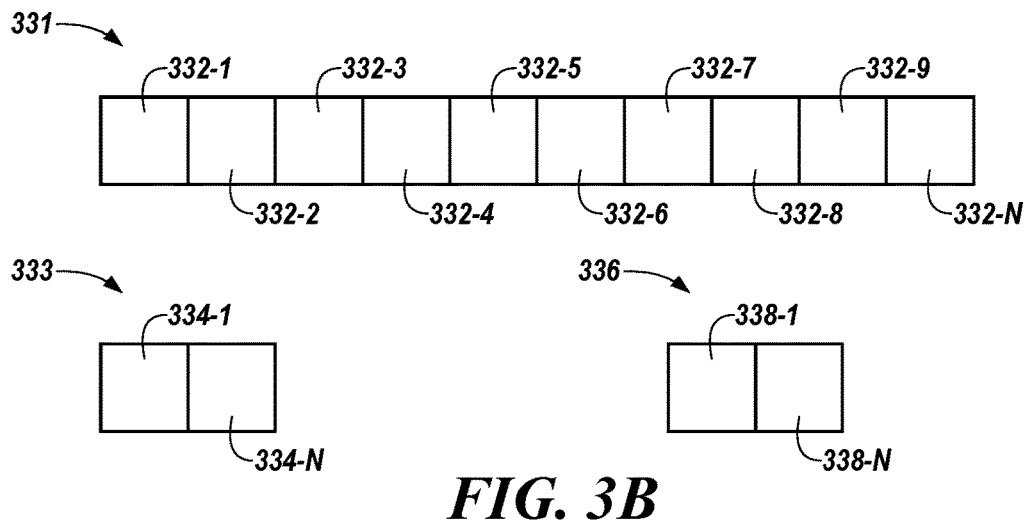
FIG. 3B is a block diagram in the form of a quire register, a factor register, and a sign bit register in accordance with a number of embodiments of the present disclosure.

FIG. 3B is a block diagram in the form of a quire register 331, a factor register 333, and a sign bit register 336 in accordance with a number of embodiments of the present disclosure. The quire register 331 and the factor register 333 can be analogous to the quire register 331 and the factor register 333 illustrated and described above in connection with FIG. 3A. In addition to the quire register 331 and the factor register 333, the embodiment shown in FIG. 3B can include a sign bit register 336, which can include storage locations 338-1 to 338-N.

The sign bit register 336 can be configured to store one or more bits corresponding to a sign (e.g., positive or negative) associated with the results of the iterations of the recursive operation, as shown and described in connection with Table 1. In some embodiments, a logical value of "0" stored in the sign bit register 336 can correspond to the sign of the result of the iteration of the recursive operation being positive, while a logical value of "1" stored in the sign bit register 336 can correspond to the sign of the result of the iteration of the recursive operation being negative.

Figure 4:
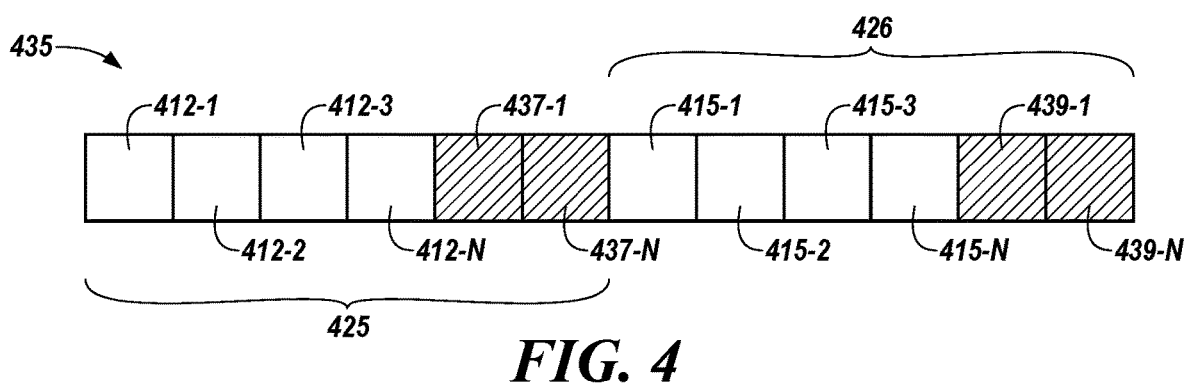
FIG. 4 is a block diagram in the form of a mixed register in accordance with a number of embodiments of the present disclosure.

FIG. 4 is a block diagram in the form of a mixed register 435 in accordance with a number of embodiments of the present disclosure. The mixed register 435 can include a quantity of storage locations 412-1, 412-2, 412-3, . . . , 412-N, 437-1, . . . , 437-N, 415-1, 415-2, 415-3, . . . , 415-N, and/or 439-1, . . . , 439-N. The storage locations 412-1, 412-2, 412-3, . . . , 412-N, 437-1, . . . , 437-N, 415-1, 415-2, 415-3, . . . , 415-N, and/or 439-1, . . . , 439-N can include sense amplifiers, latches, flip-flops, extended row address (XRA) component(s), registers, etc. that can be configured to store data values (e.g., bit strings), as described herein. In some embodiments, the quantity of storage locations 412-1, 412-2, 412-3, . . . , 412-N, and 415-1, 415-2, 415-3, . . . , 415-N can be configured to store modified results of iterations of recursive operations, while the storage locations 437-1, . . . , 437-N and/or 439-1, . . . , 439-N can be configured to store factors by which the results of the iterations of the recursive operations are modified.

In some embodiments, the modified results of iterations of a first recursive operation and the corresponding factors by which the results are modified can be stored in a first portion 425 of the mixed register 435, while the modified results of iterations of a second recursive operation and the corresponding factors by which the results are modified can be stored in a second portion 426 of the mixed register 435. This can allow for multiple recursive operations that are performed concurrently (or substantially concurrently) to leverage aspects of the present disclosure.

As used herein, the term "substantially" intends that the characteristic need not be absolute, but is close enough so as to achieve the advantages of the characteristic. For example, "substantially concurrently" is not limited to operations that are performed absolutely concurrently and can include timings that are intended to be concurrent but due to manufacturing limitations may not be precisely concurrently. For example, due to read/write delays that may be exhibited by various interfaces (e.g., DDR vs PCIe) an operation that is performed "substantially concurrently" may not start or finish at exactly the same time. For example, the operations may be performed such that at least two operations (e.g., recursive operations) are being performed at the same time regardless if one of the operations commences or terminates prior to the other.

In a non-limiting example, a host (e.g., the host 102 illustrated in FIG. 1) can be coupled to a processing device (e.g., the processing device 122 illustrated in FIG. 1). The processing device can be coupled to a plurality of storage locations (e.g., the storage locations 412-1, 412-2, 412-3, . . . , 412-N, 437-1, . . . , 437-N, 415-1, 415-2, 415-3, . . . , 415-N, and/or 439-1, . . . , 439-N. The storage locations 412-1, 412-2, 412-3, . . . , 412-N, 437-1, . . . , 437-N, 415-1, 415-2, 415-3, . . . , 415-N, and/or 439-1, . . . , 439-N). The processing device can be configured to receive a first command from the host to initiate performance of a first recursive operation using a first bit string and a second bit string and receive a second command from the host to initiate performance of a second recursive operation using a third bit string and a fourth bit string. As described above, the bit strings (e.g., the first bit string, the second bit string, the third bit string, and/or the fourth bit string) can be formatted in a fixed-point format.

The processing device can be configured to cause performance of the first recursive operation and the second recursive operation. In some embodiments, the processing device can be configured to cause the first recursive operation and the second recursive operation to be performed substantially concurrently.

The processing device can be further configured to modify a result of an iteration of the first recursive operation by a first factor such that the result of the iteration of the first recursive operation is less than a first predetermined threshold quantity of bits and/or modify a result of an iteration of the second recursive operation by a second factor such that the result of the iteration of the second recursive operation is less than a second predetermined threshold quantity of bits, as described above.

The processing device can be configured to cause the modified result of the iteration of the first recursive operation to be stored in a first portion of the plurality of storage locations 425 and cause the modified result of the iteration of the second recursive operation to be stored in a second portion of the plurality of storage locations 426. For example, the processing device can be configured to store the modified result of the iteration of the first recursive operation to be stored in the storage locations 412-1, 412-2, 412-3, . . . , 412-N, and cause the modified result of the iteration of the second recursive operation to be stored in the storage locations 415-1, 415-2, 415-3, . . . , 415-N. In addition, the processing device can be configured to cause the first factor to be stored in the first portion of the plurality of storage locations 425 and cause the second factor to be stored in the second portion of the plurality of storage locations 426. For example, the processing device can be configured to cause the first factor to be stored in the storage locations 437-1, . . . , 437-N, and cause the second factor to be stored in the storage locations 439-1, . . . , 439-N.

In some embodiments, the processing device can be configured to modify the quantity of bits of the result of the iteration of the first recursive operation and/or the result of the iteration of the second recursive operation by the factor by modifying the quantity of bits of the result of the iteration of the first recursive operation and/or the result of the iteration of the second recursive operation by a factor of $Y^X$ where Y is an integer and X corresponds to the factor. Embodiments are not so limited, however, and in some embodiments, the processing device can be configured to modify the quantity of bits of the result of the iteration of the first recursive operation and/or the result of the iteration of the second recursive operation by shifting a decimal point of the result of the iteration of the first recursive operation and/or the result of the iteration of the second recursive operation in a particular direction. As will be appreciated, embodiments are not limited to shifting a decimal point of the result of the iteration of the first recursive operation and/or the result of the iteration of the second recursive operation in a particular direction. For example, in embodiments in which the results of the iterations are stored in a fixed-point binary format, the processing device can be configured to modify the quantity of bits of the result of the iteration of the first recursive operation and/or the result of the iteration of the second recursive operation by shifting a binary point of the result of the iteration of the first recursive operation and/or the result of the iteration of the second recursive operation in a particular direction.

For example, the processing device can be configured to shift decimal point of the result of the iteration of the first recursive operation and/or the result of the iteration of the second recursive operation a quantity of positions to the left or right of the location of the decimal point immediately after the first recursive operation and/or the second recursive operation is performed. In some embodiments, the quantity of positions by which the decimal point is shifted to the left or right of the location of the decimal point immediately after the first recursive operation and/or the second recursive operation is performed can correspond to the factor, X, described above.

In some embodiments, the processing device can be configured to receive a command from the host including information corresponding to a requested accuracy for the first recursive operation and/or the second recursive operation. The information corresponding to the requested accuracy can, in turn, correspond to a quantity of bits the be retained subsequent to modifying the quantity of bits of the result of the iteration of the first recursive operation and/or the quantity of bits of the result of the iteration of the second recursive operation. For example, if it is desired that, for particular recursive operations, a higher (or lower) precision or accuracy is requested, the information corresponding to the requested accuracy can include information corresponding to how many bits are desired at each iteration of the first recursive operation and/or the second recursive operation.

In response to receipt of the command, the processing device can be configured to cause a quantity of bits available to store the modified result of the iteration of the first recursive operation and/or a quantity of bits available to store the modified result of the iteration of the second recursive operation associated with the first portion of the plurality of storage locations and/or the second portion of the plurality of storage locations to be increased or decreased based, at least in part, on the requested accuracy for the first recursive operation, the second recursive operation, or both. For example, if 10-bits are reserved for storing the modified results of the iterations of the first and/or second recursive operation and it is determined that the requested accuracy could be provided by reserving 14-bits for storing the modified results of the iterations of the first and/or second recursive operation, the processing device can cause 14-bits to be allocated among the plurality of storage locations to store the modified results of the iterations of the first and/or second recursive operation.

In some embodiments, the processing device can be configured to cause performance of the first recursive operation and the second recursive operation and modify the result of the iteration of the first recursive operation and modify the result of the iteration of the second recursive operation in the absence of a command from the host that is different than the first initiation command and the second initiation command. For example, in some embodiments, the processing device can be provisioned with sufficient computing resources that it can perform multiple steps of the embodiments disclosed herein without requiring multiple additional commands from the host.

Figure 5:
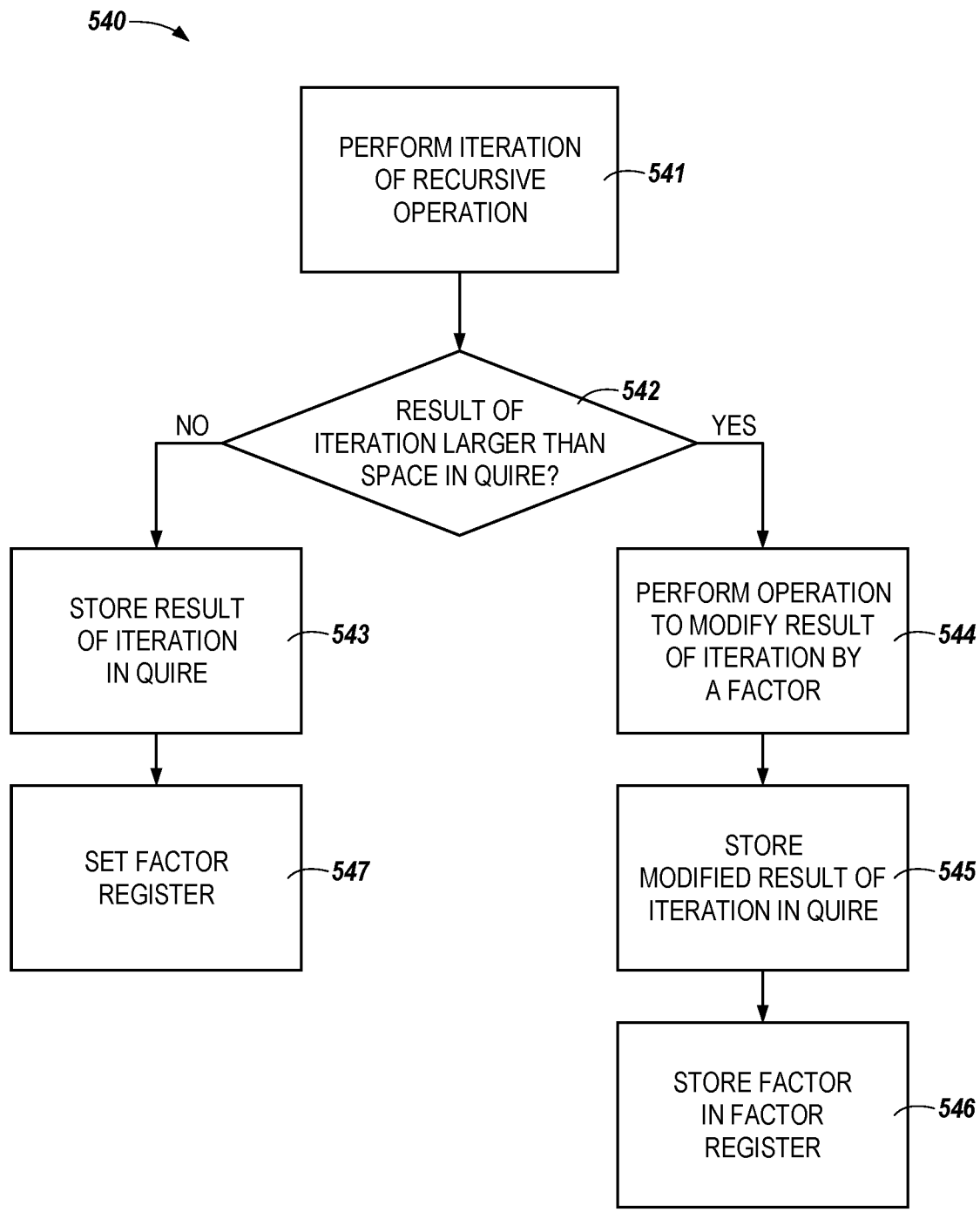
FIG. 5 is a flow diagram for bit string accumulation in accordance with a number of embodiments of the present disclosure.

FIG. 5 is a flow diagram 540 for bit string accumulation in accordance with a number of embodiments of the present disclosure. At block 541, an iteration of a recursive operation can be performed. The iteration of the recursive operation can be performed (or can be caused to be performed) by control circuitry, such as the control circuitry 120 illustrated in FIG. 1, herein. In some embodiments, the recursive operation can be performed using bit strings that are retrieved by the control circuitry in response to a determination that the recursive operation is to be performed.

At block 542, a determination can be made as to whether the result of the iteration is larger than an available amount of space in a quire register (e.g., the quire register 131 illustrated in FIG. 1, herein). For example, the control circuitry can determine if a quantity of bits associated with the result of the iteration of the recursive operation is less than a quantity of bits (or storage locations) available in the quire register to store the result of the iteration. If the result of the iteration contains fewer bits than the quantity of bits (or storage locations) available in the quire register to store the result of the iteration, at block 543 the result of the iteration can be stored in the quire register.

At block 547, the factor register (e.g., the factor register 133 illustrated in FIG. 1, herein) can be set to correspond with the result of the iteration stored in the quire register. That is, even if the result stored in the quire register has less than a quantity of bits allocated to the quire register, in some embodiments, the factor register can be set to keep track of scaling factors applied to the result(s) stored in the quire register. For example, if the result of the iteration of the recursive operation is 9 (e.g., 1001.0 in fixed-point binary), and the quire register is configured to store ten bits of the result of the iteration, a value 1001000000 can be stored in the quire register and the factor register can be set to a value of +3 corresponding to the result of the iteration being represented as $1.001 \times 2^3$.

If, however, the quantity of bits associated with the result of the iteration of the recursive operation is greater than a quantity of bits (or storage locations) available in the quire register to store the result of the iteration, at block 544, an operation can be performed to modify the result of the iteration by a factor. As described above, the factor can correspond to an order of magnitude by which the result of the iteration of the recursive operation is scaled to modify a quantity of bits of the result of the iteration such that the quantity of bits of the iteration of the recursive operation is less than the quantity of bits (or storage locations) available in the quire register to store the result of the iteration. Embodiments are not so limited, however, and in some embodiments, the control circuitry can cause additional bits or storage locations to be allocated in the quire register to accommodate a result of the iteration of the recursive operation and can cause the result of the iteration of the recursive operation to be stored in the quire register.

Once the operation to be modify the result of the iteration of the recursive operation by the factor is performed at block 544, the control circuitry can, at block 545, be configured to cause the modified result of the iteration of the recursive operation to be stored in the quire register. Further, at block 546, the control circuitry can be configured to cause the factor by which the result of the iteration of the recursive operation was modified to be stored in a factor register, such as the factor register 133 illustrated in FIG. 1, herein.

Figure 6:
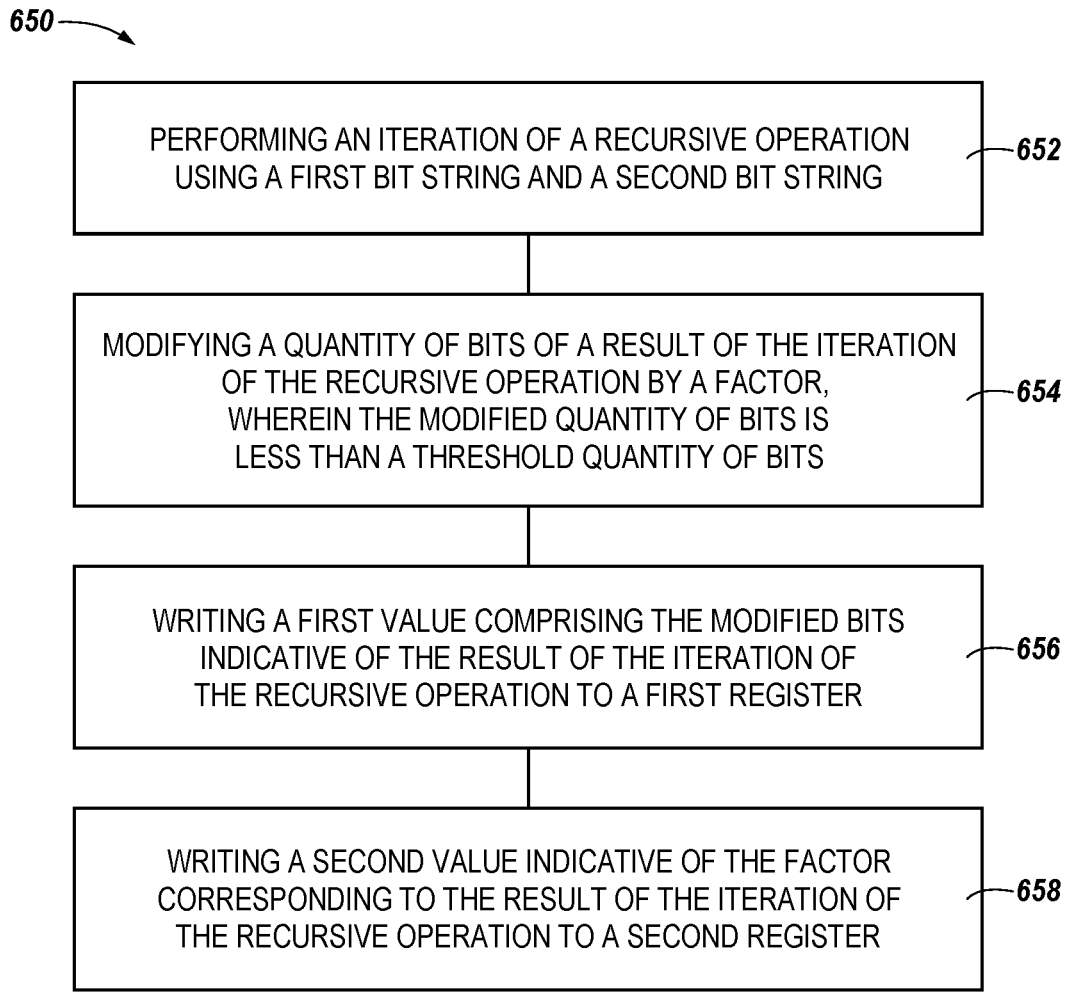
FIG. 6 is a flow diagram representing an example method for bit string accumulation in accordance with a number of embodiments of the present disclosure.

FIG. 6 is a flow diagram representing an example method 650 for bit string accumulation in accordance with a number of embodiments of the present disclosure. At block 652, the method 650 can include performing an iteration of a recursive operation using a first bit string and a second bit string. In some embodiments, the method 650 can include determining that the result of the iteration of the recursive operation corresponds to a final operation of the recursive operation, performing an operation using the result of the iteration of the recursive operation having the reduced quantity of bits and the factor to recover the result of the iteration of the recursive operation, and performing an operation to truncate the recovered result of the iteration of the recursive operation to a particular bit width.

Embodiments are not so limited, however, and in some embodiments, the method 650 can include determining that the result of the iteration of the recursive operation corresponds to a final operation of the recursive operation, performing an operation using the result of the iteration of the recursive operation having the reduced quantity of bits and the factor to recover the result of the iteration of the recursive operation, and performing an operation to convert the recovered result of the iteration of the recursive operation to a format different than a format in which the recursive operation is performed. For example, if the recovered result of the final operation of the recursive operation is stored in the fixed-point format, the method 650 can include converting the recovered result of the final operation of the recursive operation to a floating point format, a universal number format, or other format.

At block 654, the method 650 can include modifying a quantity of bits of a result of the iteration of the recursive operation, wherein the modified quantity of bits is less than a threshold quantity of bits. For example, the method 650 can include modifying the quantity of bits by a factor of $2^X$ where X corresponds to the factor. Embodiments are not so limited, however, and in some embodiments, the method 650 can include modifying the quantity of bits of the result of the iteration of the recursive operation by shifting the result of the iteration of the recursive operation in a particular direction, as described above. In some embodiments, the method 650 can include modifying the quantity of bits of the result of the iteration of the recursive operation by selectively removing a quantity of least significant bits from the result of the iteration of the recursive operation.

At block 656, the method 650 can include writing a first value comprising the modified bits indicative of the result of the iteration of the recursive operation to a first register, such as the quire register 131 illustrated in FIG. 1, herein. At block 658, the method 650 can include writing a second value indicative of the factor corresponding to the result of the iteration of the recursive operation to a second register, such as the factor register 133 illustrated in FIG. 1, herein.

In some embodiments, the method 650 can further include retrieving the result of the iteration of the recursive operation having the modified quantity of bits, retrieving the factor, and performing an operation using the result of the iteration of the operation having the modified quantity of bits and the factor to recover the result of the iteration of the operation. For example, the method 650 can include multiplying the result of the iteration of the operation having the modified quantity of bits and the factor to recover the original result of the iteration of the operation.

In some embodiments, the method 650 can include performing a second iteration of the recursive operation using the result of the iteration of the recursive operation having the modified quantity of bits and a third bit string and determining that a result of the second iteration of the recursive operation contains a quantity of bits greater than the threshold quantity of bits. As described above in connection with FIG. 4, the method 650 can further include increasing an available size of the first register and storing the result of the second iteration of the recursive operation in the first register.

Although specific embodiments have been illustrated and described herein, those of ordinary skill in the art will appreciate that an arrangement calculated to achieve the same results can be substituted for the specific embodiments shown. This disclosure is intended to cover adaptations or variations of one or more embodiments of the present disclosure. It is to be understood that the above description has been made in an illustrative fashion, and not a restrictive one. Combination of the above embodiments, and other embodiments not specifically described herein will be apparent to those of skill in the art upon reviewing the above description. The scope of the one or more embodiments of the present disclosure includes other applications in which the above structures and processes are used. Therefore, the scope of one or more embodiments of the present disclosure should be determined with reference to the appended claims, along with the full range of equivalents to which such claims are entitled.

In the foregoing Detailed Description, some features are grouped together in a single embodiment for the purpose of streamlining the disclosure. This method of disclosure is not to be interpreted as reflecting an intention that the disclosed embodiments of the present disclosure have to use more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. A method, comprising:
writing a first value corresponding to a first quantity of bits associated with a result of a first iteration of a recursive operation to a first register;
writing a second value corresponding to a factor used to modify the result of the first iteration to a second register;
determining that a result of a second iteration of the recursive operation contains a quantity of bits greater than a threshold quantity of bits;
increasing an available size of the first register responsive to determining that the result of the second iteration of the recursive operation contains a quantity of bits greater than the threshold quantity of bits; and
writing the result of the second iteration to the first register.

2. The method of claim 1, wherein the first iteration of the recursive operation is performed using a first bit string and a second bit string, and wherein the second iteration of the recursive operation is performed using the first value and the first bit string or the first value and the second bit string.

3. The method of claim 1, wherein the first iteration of the recursive operation is performed using a first bit string and a second bit string, and wherein the second iteration of the recursive operation is performed using the first value and a third bit string.

4. The method of claim 1, further comprising modifying a quantity of bits associated with the result of the first iteration of the recursive operation such that the modified quantity of bits is less than the threshold quantity of bits.

5. The method of claim 1, further comprising:
reading the first value from the first register;
reading the second value from the second register; and
performing an operation using the first value and the second value to recover the result of at least one iteration of the recursive operation.

6. The method of claim 1, further comprising:
determining that the result of the first iteration or the second iteration of the recursive operation corresponds to a final result of the recursive operation;
performing an operation using the first value and the second value to recover the final result of the recursive operation; and
performing an operation to truncate the recovered result of the recursive operation to a particular bit width.

7. The method of claim 1, further comprising:
determining that the result of the first iteration or the second iteration of the recursive operation corresponds to a final operation of the recursive operation;
performing an operation using the result of the first iteration or the second iteration of the recursive operation having the first value and the second value to recover the result of the first iteration or the second iteration of the recursive operation; and
performing an operation to convert the recovered result of the first iteration or the second iteration of the recursive operation to a format different than a format in which the recursive operation is performed.

8. The method of claim 1, further comprising modifying a quantity of bits associated with the result of the first iteration of the recursive operation to generate the first quantity of bits by:
modifying the quantity of bits by a factor of $2^X$ where X corresponds to the factor,
shifting the result of the first iteration of the recursive operation in a particular direction with respect to the first register, or
selectively removing a quantity of least significant bits from the result of the first iteration of the recursive operation.

9. An apparatus, comprising:
a memory device comprising a first register and a second register; and
a processing device configured to:
reduce a quantity of bits associated with at least a portion of bits of a result of a first arithmetic operation, or a first logical operation, or both;
cause a first value corresponding to the reduced quantity of bits of the result of the first arithmetic operation, the first logical operation, or both to be written to the first register;
cause a first factor used to reduce the quantity of bits of the result of the first arithmetic operation, the first logical operation, or both to be written to the second register;
set a quantity of bits for use by the first register to a quantity of bits substantially equal to a quantity of bits associated with the first arithmetic operation, the first logical operation, a second arithmetic operation, or a second logical operation, or any combination thereof; and
modify the quantity of bits for use by the first register responsive to determining that a result of a subsequent iteration of the first arithmetic operation, or the first logical operation, or both, contains a quantity of bits greater than a threshold quantity of bits.

10. The apparatus of claim 9, wherein the processing device is further configured to:
cause a second value corresponding to a reduced quantity of bits of a result of the second arithmetic operation, the second logical operation, or both to be written to the first register; and
cause a second factor used to reduce the quantity of bits of the result of the second arithmetic operation or the second logical operation, or both to be written to the second register.

11. The apparatus of claim 10, wherein the processing device is further configured to perform an operation using the second value and the second factor to recover the result of the second arithmetic operation or the second logical operation, or both.

12. The apparatus of claim 11, wherein the processing device is further configured to perform an operation to convert the recovered result of the second arithmetic operation or the second logical operation, or both to a format different than a format in which the first operation or the second operation is performed.

13. The apparatus of claim 9, wherein the processing device is further configured to reduce the quantity of bits associated with at least the portion of bits of the result of the first arithmetic operation, the first logical operation, or both, by shifting a binary point associated with associated with at least the portion of the bits of the result of the first arithmetic operation, or the first logical operation, or both.

14. The apparatus of claim 9, wherein the first factor corresponds to a value of X, where X is a power of 2.

15. A system, comprising:
a processing device; and
a plurality of storage locations coupled to the processing device, wherein the processing device is configured to:
modify a result of an iteration of a first recursive operation;
modify a result of an iteration of a second recursive operation;
receive a command including information corresponding to a requested accuracy for the first recursive operation, the second recursive operation, or both; and
cause a quantity of bits available to store the modified result of the iteration of the first recursive operation, the modified result of the iteration of the second recursive operation, or both, to be increased or decreased based, at least in part, on the requested accuracy for the first recursive operation, the second recursive operation, or both.

16. The system of claim 15, wherein the processing device is further configured to:
cause a first factor corresponding to the modified result of the iteration of the first recursive operation to be stored in a first portion of the plurality of storage locations; and
cause a second factor corresponding to the modified result of the modified iteration of the second recursive operation to be stored in a second portion of the plurality of storage locations.

17. The system of claim 15, wherein the processing device is further configured to modify the quantity of bits available to store the modified result of the iteration of the first recursive operation, the modified result of the iteration of the second recursive operation, or both, by causing a binary point of the result of the iteration of the first recursive operation, the result of the iteration of the second recursive operation, or both, to be shifted by a factor of $Y^X$ where Y is an integer and X corresponds to a quantity of positions by which the binary point of the result of the iteration of the first recursive operation, the result of the iteration of the second recursive operation, or both, is shifted.

18. The system of claim 15, wherein the processing device is further configured to modify the quantity of bits available to store the result of the iteration of the first recursive operation, the result of the iteration of the second recursive operation, or both, by shifting a binary point of the result of the iteration of the first recursive operation, the result of the iteration of the second recursive operation, or both, in a particular direction.

19. The system of claim 15, wherein the processing device is further configured to modify the quantity of bits available to store the result of the iteration of the first recursive operation, the result of the iteration of the second recursive operation, or both, by selectively storing a quantity of most significant bits from the result of the iteration of the first recursive operation, the result of the iteration of the second recursive operation, or both.

20. The system of claim 15, wherein the processing device is further configured to cause the first recursive operation and the second recursive operation to be performed substantially concurrently.

* * * * *